(12) United States Patent
Tapscott et al.

(10) Patent No.: US 8,838,428 B2
(45) Date of Patent: Sep. 16, 2014

(54) METHODS AND SYSTEMS TO VOLUMETRICALLY CONCEPTUALIZE HYDROCARBON PLAYS

(75) Inventors: Christopher Tapscott, Houston, TX (US); Steven R. Schreuder, The Woodlands, TX (US); Ronald J. Kleist, Houston, TX (US); Richard Thomas Mifflin, Houston, TX (US); Can Ardic, London (GB); Pierre Kedzierski, Houston, TX (US); Kinesh K. Patel, Plano, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 291 days.

(21) Appl. No.: 13/132,860

(22) PCT Filed: Oct. 23, 2009

(86) PCT No.: PCT/US2009/061830
§ 371 (c)(1),
(2), (4) Date: Jun. 3, 2011

(87) PCT Pub. No.: WO2010/082969
PCT Pub. Date: Jul. 22, 2010

(65) Prior Publication Data
US 2011/0264430 A1    Oct. 27, 2011

Related U.S. Application Data

(60) Provisional application No. 61/144,318, filed on Jan. 13, 2009.

(51) Int. Cl.
*G06G 7/48* (2006.01)
(52) U.S. Cl.
USPC .................................. 703/10; 702/13; 702/18

(58) Field of Classification Search
CPC ..... G01V 99/00; G06F 17/50; G06F 17/5004; G06F 2217/04
USPC .......................................... 703/10; 702/18, 13
See application file for complete search history.

(56) References Cited

U.S. PATENT DOCUMENTS

| 3,180,983 A | 4/1965 | Hall et al. |
| 5,001,634 A | 3/1991 | Nordin |

(Continued)

FOREIGN PATENT DOCUMENTS

| EP | 1 228 385 | 10/2008 |
| WO | WO 2006/016942 | 2/2006 |

(Continued)

OTHER PUBLICATIONS

Magoon, Leslie B. et al., "The Petroleum System", 1994, The Petroleum System-Fron Source to Trap, AAPG Memoir 60.*

(Continued)

*Primary Examiner* — Kamini S Shah
*Assistant Examiner* — Cedric D Johnson
(74) *Attorney, Agent, or Firm* — ExxonMobil Upstream Research Co. Law Dept.

(57) ABSTRACT

Methods for identifying hydrocarbon plays include applying predictive models to sediment fill volume(s) to provide play-element volume(s) representing at least one play element. Each play-element volume represents at least 1) qualities of the at least one play element and 2) a probability that the at least one play element satisfies determined criteria for each of a plurality of locations within a basin. The methods further include analyzing the play-element volume(s) to define play-concept volume(s) representing hydrocarbon play(s). Each of a plurality of locations within the play-concept volume(s) is attributed with: 1) an identification of each play element associated with the location, 2) the qualities of each play element, 3) the probability for each play element that it satisfies determined criteria, and 4) a composite likelihood that the location represents a hydrocarbon play. At least one of the volumes may be used to identify hydrocarbon play(s).

22 Claims, 18 Drawing Sheets

(56) References Cited

U.S. PATENT DOCUMENTS

| | | | |
|---|---|---|---|
| 5,311,484 A | 5/1994 | Anderson et al. | |
| 5,475,589 A | 12/1995 | Armitage | |
| 5,844,799 A * | 12/1998 | Joseph et al. | 702/2 |
| 6,246,963 B1 | 6/2001 | Cross et al. | |
| 6,381,543 B1 | 4/2002 | Guerillot et al. | |
| 6,438,493 B1 | 8/2002 | West et al. | |
| 6,446,006 B1 | 9/2002 | Thore | |
| 6,597,995 B1 | 7/2003 | Cornu et al. | |
| 6,751,558 B2 | 6/2004 | Huffman et al. | |
| 6,754,588 B2 | 6/2004 | Cross et al. | |
| 6,970,397 B2 | 11/2005 | Castagna et al. | |
| 7,043,367 B2 * | 5/2006 | Granjeon | 702/2 |
| 7,117,091 B2 | 10/2006 | Masson et al. | |
| 7,257,488 B2 | 8/2007 | Cacas | |
| 7,337,069 B2 | 2/2008 | Masson et al. | |
| 7,392,136 B2 | 6/2008 | Salles et al. | |
| 2002/0177986 A1 | 11/2002 | Moeckel et al. | |
| 2007/0203677 A1 | 8/2007 | Awwiller | |
| 2008/0195319 A1 * | 8/2008 | Wilkinson et al. | 702/6 |
| 2010/0175886 A1 | 7/2010 | Bohacs et al. | |

FOREIGN PATENT DOCUMENTS

| | | |
|---|---|---|
| WO | WO 2007/106711 | 9/2007 |
| WO | WO 2009/011737 | 1/2009 |

OTHER PUBLICATIONS

Borge, Hans, "Fault Controlled Pressure Modeling in Sedimentary Basins", Feb. 2000, Thesis, Department of Mathematical Sciences, Norwegian University of Science and Technology.*

Yang, X.-S., A Unified Approach to Mechanical Compaction, Pressure Solution, Mineral Reactions and the Temperature Distribution in Hydrocarbon Basins, 2001, Tectonophysics 330, Elsevier Science B.V.*

Barron, (1985) "Numerical climate modeling, a frontier in petroleum source rock prediction: results based on Cretaceous simulations," *American Association of Petroleum Geologists Bulletin* 69, 448-459.

Bohacs et al., (2005) "Production, Destruction, Dilution, and Accommodation—the many paths to source-rock development," *The Deposition of Organic Carbon-Rich Sediments: Mechanisms, Models and Consequences*, SEPM Special Publication 82, p. 61-101.

Carman, P. (1937) "Fluid flow Through a Granular Bed", *Transactions—Institution of Chemical Engineers*, 15, 150-167.

Carruthers, D.J., (2003), "Modeling of Secondary Petroleum Migration Using Invasion Percolation Techniques", Multidimensional basin modeling, *AAPG/Datapages Discovery Series* No. 7, p. 21-37.

Cathro, D.L., et al. (2006). "Cretaceous-Tertiary inversion history of the Dampier sub-basin, northwest Australia: Insights from quantitative basin modeling". *Marine and Petroleum Geology*, 23, 503-526.

Costa, A. (2006) "Permeability-porosity relationship: a reexamination of the Kozeny-Carman equation based on a fractal pore-space geometry assumption", *Geophysical Research Letters*, 33. L02318.

Driscoll, N.W., et al. (1998). "Lower crustal extension across the Northern Carnarvon basin, Australia: Evidence for an eastward dipping detachment", *Journal of Geophysical Research*, vol. 103, No. B3, pp. 4975-4992.

Falvey, D.G. et al. (1981) "Passive continental margins: evidence for prebreakup deep crustal metamorphic subsidence mechanism" *Oceanologica Acta*, vol. 4, pp. 103-114.

Heins, W.A.et al, (2007) "Predicting Sand Character with Integrated Genetic Analysis", *Geological Society of America Special Paper* 420:345-379.

Hood, K.C. et al., (2000) "Use of Geographic Information Systems in Hydrocarbon Resource Assessment and Opportunity Analysis" *Geographic Information Systems in Petroleum Exploration and Development* AAPG Computer Applications in Geology No. 4:173-186.

Huvaz, O., et al. (2007) "Petroleum systems and Hydrocarbon Potential Analysis of the Northwestern Uralsk Basin, NW Kazakhstan, by Utilizing 3D Basin Modeling Methods", *Marine and Petroleum Geology* 24, 247-275.

Granjeon, D. et al (1999), Concepts and Applications of a 3D Multiple Lithology, Diffusive Model in Stratigraphy Modelling:, *Numerical Experiments in Stratigraphy: Recent Advances in Stratigraphic and Sedimentologic Computer Simulations*. SEPM Special Publications 62.

Karner, G.D., et al. (1997) "Tectonic significance of syn-rift sedimentary packages across the Gabon-Cabinda continental margin". *Marine and Petroleum Geology*, vol. 14, 973-1000.

Karner, G.D., et al. (1999) "Tectonic and stratigraphic development of the West African and eastern Brazilian Margins: insights from quantitative basin modeling" *Geologic Society, London Special Publication*, vol. 153, 11-40.

Karner, G.D., (1999) "Style, timing, and distribution of tectonic deformation across the Exmouth Plateau, northwest Australia, determined from stratal architecture and quantitative basin modeling" *Geological Society, London, Special Publication* vol. 164, 271-311.

Karner, G.D., (2003) "Synrift subsidence across the West African continental margin: The role of lower plate ductile extension" *Geological Society, London, Special Publication*, vol. 207, 105-125.

Katz, A. J. et al. (1986) "Quantitative prediction of permeability in porous rock", *Physical Review B.*, 34(11), 8179-8181.

Knies et al. (2002) "Depositional environment and source rock potential of Miocene strata from the central Fram Strait: introduction of a new computing tool for simulating organic facies variations," *Marine and Petroleum Geology*, 19, 811-828.

Kruijs et al. (1990) "Climate model prediction of paleoproductivity and potential source-rock distribution," *American Association of Petroleum Studies in Geology* 30, 195-216.

Mann et al. (2008) "Modelling source rock distribution and quality variations: The organix facies modeling approach", *Special Publication, International Association of Sedimentologists* No. 40, 239-274.

Parrish, J.T., (1982) "Upwelling and petroleum source beds, with reference to Paleozoic," *American Association of Petroleum Geologists Bulletin* vol. 66, No. 6, 750-774.

Sneider, R.M., et al. (1997), Comparison of Seal Capacity Determinations: Conventional Cores vs. Cuttings, in R.C. Surdam, ed., Seals, traps, and the petroleum system: AAPG Memoir 67, p. 1-12.

Steckler, M.S et al. (1978) "Subsidence of the Atlantic-type continental margin off New York", *Earth and Planet. Science Letters*, 41, 1-13.

Sun, T.P. et al. (1996), "A Simulation Model for Meandering Rivers", *Water Resources Research*, vol. 32(9), 2937-2954.

Vail, P.R. et al, (1977) "Seismic Stratigraphy and Global Changes in Sea Level", in *AAPG Memoir 26, Seismic Stratigraphy—Applications to Hydrocarbon Exploration*, pp. 51-212.

Watney, W.L., et al. (1999), "Perspectives on stratigraphic simulation models: current approaches and future opportunities", Society for Sedimentary Geology, *SEPM Special Publications* 62.

Watts, A.B. et al., (1976) "Flexure of the lithosphere and continental margin basins", *Tectonophysics*, 36, 25-44.

Weissel, J.K. et al. (1989) "Flexural Uplift of Rift Flanks Due to Mechanical Unloading of the Lithosphere During Extension", *Journal of Geophysical Research* vol. 94, No. B10, pp. 13,919-913,950.

White, D. A., (1988) "Oil and Gas Play Maps in Exploration and Assessment", *American Association Petroleum Geologists Bulletin*, vol. 72, No. 8, 944-949.

Exploration Technologies, Inc., Seismic-Geochemical Prospecting Surface and Maine Surveys 2002 (Retrieved from internet May 16, 2011) http://www.eti-geochemistry.com/geoexp/index.html.

EP Search Report dated Sep. 18, 2009 (09157942.5-1240 corresponding to U.S. Appl. 61/144,318.

International Search Report for PCT/US2009/061830, Mar. 31, 2010.

* cited by examiner

METHODS AND SYSTEMS TO VOLUMETRICALLY CONCEPTUALIZE HYDROCARBON PLAYS

CROSS-REFERENCE TO RELATED APPLICATION

This application is the National Stage of International Application No. PCT/US2009/061830, filed 23 Oct. 2009, which claims the benefit of U.S. Provisional Patent Application No. 61/144,318, filed 13 Jan. 2009 entitled METHODS AND SYSTEMS TO VOLUMETRICALLY CONCEPTUALIZE HYDROCARBON PLAYS, the entirety of which is incorporated by reference herein.

FIELD

The present disclosure relates generally to hydrocarbon systems analysis and efforts to identify hydrocarbon plays in geologic basins. More particularly, the present disclosure relates to methods and systems to conceptualize hydrocarbon plays in sedimentary basins using volumetric analysis of the basins.

BACKGROUND

This section is intended to introduce the reader to various aspects of art, which may be associated with embodiments of the present invention. This discussion is believed to be helpful in providing the reader with information to facilitate a better understanding of particular techniques of the present invention. Accordingly, it should be understood that these statements are to be read in this light, and not necessarily as admissions of prior art.

As is well known, current energy demands are primarily satisfied through hydrocarbons, which are becoming harder to find in and extract from the subsurface. Hydrocarbons can be located in formations under all sorts of terrain, including urban environments, wilderness environments, arctic environments, and deep water environments. Moreover, the hydrocarbons can be found in the earth in a variety of forms, including liquid (e.g., oil of a variety of types or qualities) and gas (e.g., methane, etc.) forms. Regardless of the type of hydrocarbon being sought, the present application refers to them all, collectively and individually, as hydrocarbons. Similarly, regardless of where the hydrocarbon may be found, it may be said that the hydrocarbon is found in the subsurface of the earth. Entities in the business of finding and/or extracting hydrocarbon reserves from the subsurface face many challenges, including finding the reserve beneath thousands of feet of rock and, sometimes, water; determining and executing an environmentally and economically practical method of accessing the hydrocarbons; and determining and executing an efficient method of producing the hydrocarbons. While overcoming each and all of these challenges is required for a profitable venture, the technology of the present disclosure relates primarily to methods and systems for finding hydrocarbons in the subsurface. While the discussion herein will not address the challenges of drilling a well, completing a well, operating a well, or the other challenges in providing a producing well, it will be understood that aspects of the present technology may be adapted for use in other phases of the life-cycle of the well.

By way of introduction and background, hydrocarbons are generally found in geologic basins. While some geologic basins formed in the relatively recent past were sufficiently close to the surface to be identifiable by a trained eye on visual inspection, reserves in such basins have been substantially identified and recovered. Accordingly, modern hydrocarbon recovery operations depend on the identification of geologic basins deeper in the earth. Geologic basins are identified through a variety of technologies, including magnetic surveys, gravity surveys, and seismic surveys. Each of these technologies provides important information about the subsurface formations and each provide different types of information helpful in the identification of possible hydrocarbon accumulations. While some survey technologies are considered more complete or more thorough than others, none of the survey technologies will directly or explicitly reveal the location of hydrocarbons or the quantity or volume of hydrocarbons. Thus exploration activities (i.e., efforts to identify new accumulations and/or new prospects) require geoscientists to analyze and/or interpret the survey data to make estimates or predictions regarding the location and volume of hydrocarbons. For convenience herein, the term "geoscientist" is used expansively to include individuals involved in the study of the subsurface to identify hydrocarbons (i.e., individuals involved in the exploration activities), including geologists, geophysicists, engineers, and business executives.

As is well understood, once a geologic basin is identified, the geoscientists must determine whether the geologic basin contains one or more plays, or regions in the subsurface to which hydrocarbons migrated, in which hydrocarbons accumulated, and in which hydrocarbons are stored or trapped. A number of geologic and historical events or conditions are generally believed to be necessary for the existence of a play in a given region of the basin; such events and conditions are referred to as "play elements." Exemplary play elements include reservoir (porous and permeable rocks where recoverable hydrocarbons may reside), trap (potential hydrocarbon containers), source (organic-rich rocks from which hydrocarbons may be generated), maturity, yield, seal (impermeable rocks that act as barriers to hydrocarbon movement), migration (or viable migration pathways along which hydrocarbon may move from source to reservoir), and timing (having these elements in place in proper temporal relationship to the availability of hydrocarbons). When there is a suitable temporal and spatial confluence of play elements in a substantially contiguous (e.g., regions in fluid communication if not adjacent) geologic volume, geoscientists studying the basin will identify the area as a play. A single geologic basin may include multiple plays, which may be distributed in all three dimensions of the basin. While two plays may be adjacent or near to each other, they may be defined as distinct plays due to varying characteristic in one or more of the play elements.

The division of the geologic basin into one or more plays assists the geoscientists in the conventional next step of identifying prospects within the plays. The term "prospect" refers to regions within the play where an economic quantity of hydrocarbons is believed to exist. Once a play is identified, the study of the basin typically shifts dramatically and tools and resources are focused on the play to identify where within the play a well could be drilled to access the hydrocarbons believed to be within the play region. While a prospect may refer to an actual well intended to intersect a reservoir, prospect-level analysis typically focuses on a finer granularity as compared to play-level analysis but not to the specifics of well trajectory and drilling plans.

It can be seen that the conventional exploration workflow progressively focuses attention on smaller and smaller regions of the subsurface. The subsurface under a large surface area is surveyed to identify geologic basins; the geologic basins are studied to identify one or more plays within the basin; and the plays are studied to identify one or more prospects within the plays. Exploration teams investigating a geologic basin attempt to identify, map, and evaluate all the potential hydrocarbon plays within the basin. Generally, this is done by developing maps of the individual play elements on selected stratigraphic horizons or units. Usually, this work is addressed by sub-teams of geoscientists, each expert in the issues pertinent to a given play element and responsible for data analysis, interpretation, and mapping of that play element. The play-element maps are then combined and examined together for the favorable relationships that suggest a potential play concept. These potential play concepts are summarized in play maps and play summary charts, which form a basis for further evaluation.

This approach, while fundamentally robust in attempting to identify all of the potential plays in the basin, often suffers in practice due to the cost and complexity of developing the play-element maps and the play concepts. During the process of developing the play maps and/or play summary charts, work quickly tends to become focused toward a relatively small number of play concepts that are identified or suspected early in the process. In part, the narrowing focus results from the fact that the analysis, interpretation, and mapping of the individual play elements often requires a high degree of expertise and can be very time-consuming. There is a natural pressure to focus effort toward early-recognized play concepts and avoid interpretation and mapping work for which there is no recognized reward. For example, the early analysis of a basin may reveal that one play element is particularly positive in one region of the basin. The other sub-teams considering other play elements are then motivated to perform their analysis on this region before, and perhaps to the exclusion of, other regions of the basin. While the other regions may be studied, interpreted, and mapped at a later time, this early narrowing focus inhibits full consideration of the hydrocarbon implication of multiple scenarios of basin evolution. For example, information learned through the analysis of one play element in region X of a basin may impact assumptions and/or estimates made in the analysis of a second play element in region Y of the basin. For example, many play element interpretations rely upon understandings or estimates regarding the evolution of a geologic basin and the conditions in the basin over thousands of years. Conclusions regarding some play elements may affect the interpretation of other play elements, such as one evolutionary estimate or theory for a first play element interpretation being inconsistent with an evolutionary theory applied for an interpretation of a second play element.

Additionally, while the play-element maps and play maps produced with this early, narrowed focus describe and delineate the early-identified play concepts very well, they are of limited value in helping the exploration team recognize additional play concepts that may exist in the basin. Additionally, as information regarding the basin is updated through exploration, development, and production operations, this information is generally not incorporated back into the play element maps and play maps for the entire basin due to the cost and complexity of updating the play element maps even though the implications of the information are understood to potentially affect the entire basin. For these and other reasons, creativity or serendipity continues to discover hitherto unsuspected plays in basins of even advanced exploration maturity.

Accordingly, the need exists for systems and methods to allow geoscientists to perform basin-level study of play elements to identify play concepts in the basin. Additionally or alternatively, systems and methods are needed to render the basin-level and play-level studies more economical to facilitate the basin-level analysis and to facilitate the repetitive updating of the basin-level and play-level studies. The technologies in the present disclosure are believed to satisfy, at least in part, one or more of these needs.

Other related material may be found in at least U.S. Pat. No. 7,043,367. Further, additional information may be found in U.S. Patent Publication No. 2007/0203677 A1; and International Patent Publication No. WO 2006/016942 A1. Still further, additional information may be found in W. A. Heins & S. Kairo, *Predicting Sand Character with Integrated Genetic Analysis*, Geological Society of America Special Paper 420:345-379 (2007); and K. C. Hood et al., *Use of Geographic Information Systems in Hydrocarbon Resource Assessment and Integrated Opportunity Analysis* in Geographic Information Systems in Petroleum Exploration and Development (T. C. Coburn & J. M. Jams eds), AAPG Computer Applications in Geology 4:173-186 (2000).

SUMMARY

The present disclosure provides systems and methods for identifying hydrocarbon plays in sedimentary basins. In some implementations, the methods include providing a sediment fill volume, applying one or more predictive models to the sediment fill volume to provide at least one play-element volume, analyzing the at least one play-element volume to define at least one play-concept volume, exporting at least one of the play-element volumes and the play-concept volumes, and utilizing at least one of the volumes to identify hydrocarbon play(s). The sediment fill volume may represent at least one of lithology distribution, sediment age distribution, depositional conditions distribution, burial history, erosion history, and compaction history in a geologic basin. Each play-element volume may provide at least a three dimensional representation of at least one play element. For each of a plurality of locations within the geologic basin, each of the at least one play-element volumes may represent, among other things, the qualities of the at least one play element and a probability that the at least one play element satisfies determined criteria. Each play-concept volume may provide a three-dimensional (or four-dimensional) representation of a hydrocarbon play in a subsurface formation. Each of a plurality of locations within the play-concept volume may be attributed with: 1) an identification of each play element associated with the location, 2) the qualities of each play element associated with the location, 3) the probability for each play element that the play element satisfies determined criteria, and 4) a composite likelihood that the location represents a hydrocarbon play.

Additionally or alternatively, the present disclose is directed to systems for use in identifying hydrocarbon plays in sedimentary basins. Some implementations of the present systems may include a processor adapted to execute instructions, a storage medium in communication with the processor; and at least one instruction set accessible by the processor and saved in the storage medium. The at least one instruction set may be adapted to 1) access a sediment fill volume, 2) apply one or more predictive models to the sediment fill volume to provide at least one play-element volumes, 3) analyze at least one of the play-element volumes to define one or more play-concept volumes, and 4) export at least one of the at least one play-element volume and the at least one play-concept volume for use by geoscientists in identifying one or more hydrocarbon plays. The sediment fill volume, the predictive models, the play-element volumes, and the play-concept volumes may be as described above in connection with the methods.

BRIEF DESCRIPTION OF THE DRAWINGS

The foregoing and other advantages of the present technique may become apparent upon reading the following detailed description and upon reference to the drawings in which.

DETAILED DESCRIPTION

Figure 1:
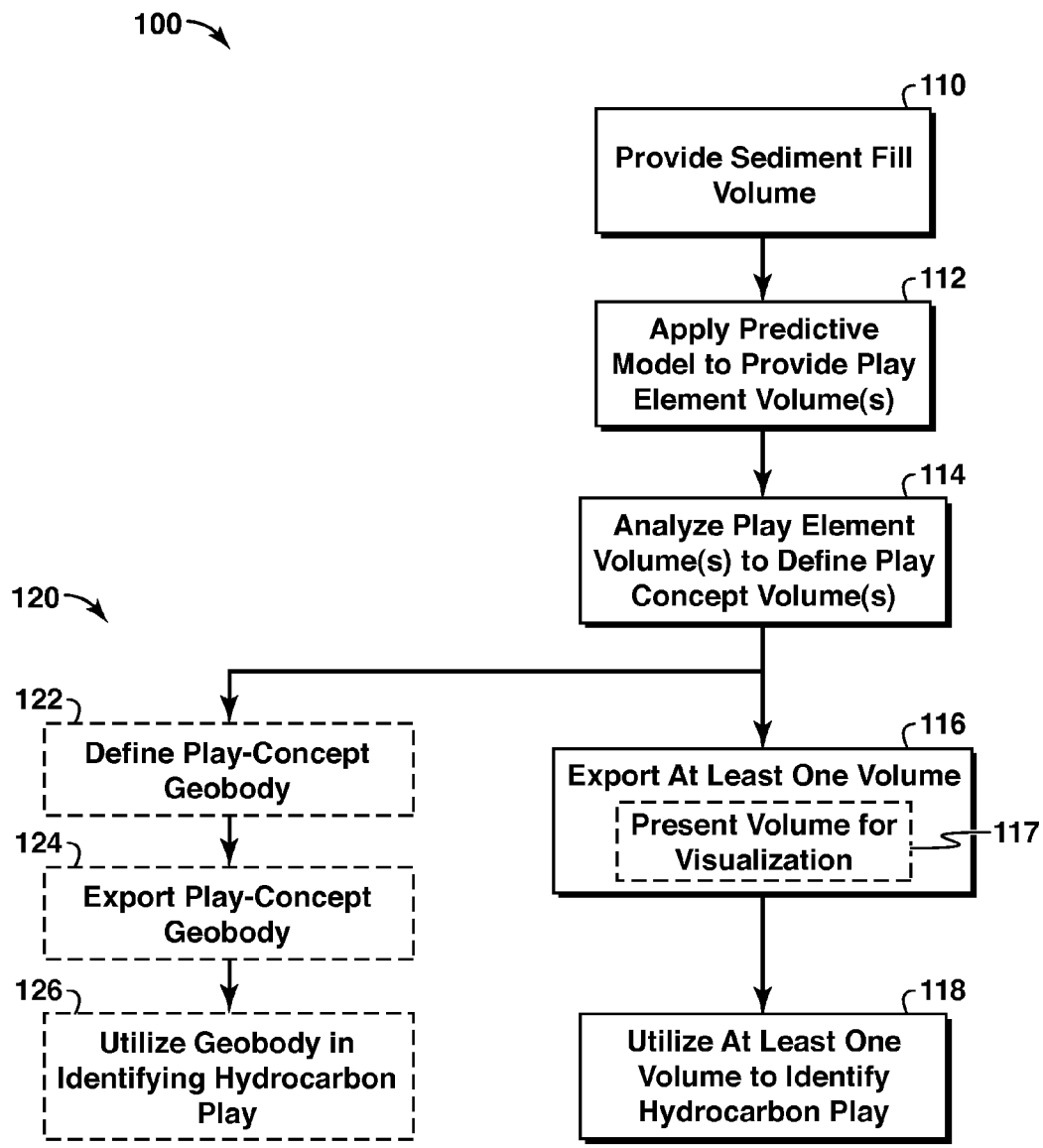
FIG. 1 is a schematic flow chart of methods within the scope of the present disclosure.

In the following detailed description, specific aspects and features of the present invention are described in connection with several embodiments and/or implementations. However, to the extent that the following description is specific to a particular embodiment or a particular use of the present techniques, it is intended to be illustrative only and merely provides a concise description of exemplary embodiments. Moreover, in the event that a particular aspect or feature is described in connection with a particular embodiment, such aspects and features may be found and/or implemented with other embodiments of the present invention where appropriate. Accordingly, the invention is not limited to the specific embodiments described below, but rather; the invention includes all alternatives, modifications, and equivalents falling within the scope of the appended claims.

The present disclosure is directed to methods and systems to efficiently, and with a high degree of completeness, identify, delineate, and characterize the potential play concepts that should be considered in a given geologic basin, or in any given portion of such a basin. Generally speaking, the present systems and methods utilize basin fill models conditioned or constrained by geologic data and/or exploration-scale interpretation to produce one or more play-element volumes, which each may be considered to be a set of 3D or 4D models of play elements within the basin. For each of a variety of locations within the basin, the one or more play-element volumes is attributed with properties to represent at least 1) qualities of the play-element at the location and 2) probabilities that the play element satisfies determined criteria at the location. The play-element volumes are then analyzed to define at least one play-concept volume. The play-concept volumes are identified by analyzing the relationships among the several play-element volumes to identify, delineate, and characterize potential plays. Each of a plurality of locations within the 3D (or 4D) play-concept volume is attributed with properties to represent 1) the play elements associated with the location; 2) the various qualities of the various play elements associated with the location; 3) the probability that each play element satisfies determined criteria; and 4) a composite likelihood that the location represents a hydrocarbon play. Accordingly, the play-concept volume identifies and describes a largely complete range of potential hydrocarbon plays that should be considered in the basin. The characterization of each play concept (the play elements, their relationships that led to its identification, the probabilities associated with the play concept and its component elements) help define an efficient plan for testing the concept(s) in order either to reject it or to confirm and further refine it. Additionally, the play-concept volume is available for updating as additional information is obtained and input into the analysis. Similarly, as information is added to the analysis, the models and interpretations used to develop the play-element volumes and/or the play-concept volumes may be further refined to improve the accuracy of the play-concept volumes of the basin and/or the play-concept volumes developed for other basins.

Turning now to FIG. 1, a flow chart 100 of methods within the present disclosure is provided. The flow chart 100 will be described first in general terms followed by a more detailed discussion of each step within the illustrated method. Additionally, variations on the methods 100 will be described in connection with subsequent flow charts shown in FIGS. 3-5. Still further, exemplary implementations of the present methods will be described in connection with FIGS. 6-21.

As illustrated in FIG. 1, methods within the scope of the present invention include providing a sediment fill volume, at 110. One or more predictive models are then applied to the sediment fill volume to provide at least one play-element volumes, at 112. At least one of the play-element volumes is analyzed to define at least one play-concept volume, at 114. At least one of the play-element volume(s) and the play-concept volume(s) are exported, at 116, which may include presenting the one or more volumes for visualization, at 117. Additionally, at least one of the play-element volume(s) and the play-concept volume(s) may be utilized to identify one or more hydrocarbon plays in the geologic basin, at 118. FIG. 1 further illustrates that the methods 100 may optionally include steps 120 to define and utilize a geobody. Such geobody-related steps 120 may include: defining a play-concept geobody (at 122); exporting the play-concept geobody (at 124); and utilizing the play-concept geobody in identifying hydrocarbon play(s) (at 126).

The sediment fill volume provided at 110 may be configured to represent a variety of properties related to a geologic basin. For example, the sediment fill volume may represent one or more distributions and/or histories of the geologic basin in an effort characterize the current condition of the basin based on historical conditions and events. Exemplary distributions that may be represented by the sediment fill volume include the distribution of lithology, the sediment age distribution, and the distribution of depositional conditions. Exemplary histories that may be represented by the sediment fill volume may include the burial history, the erosion history, and the compaction history of the geologic basin. The sediment fill volume may be provided in a variety of manners, including conventional manners such as utilizing a sediment fill model. The models used to prepare the sediment fill volume may incorporate measured geologic data from the basin and/or estimated geologic data. In some implementations, the sediment fill volume may be forward-modeled on the basis of geologic data and concepts supplied by geoscientists. These forward models may be constrained by fundamental controls on sediment input, character, and distribution over the geologic time period of interest. The sediment fill forward model also may be constrained by the structural evolution of the basin. Geoscientists are able to generate multiple realizations of the forward model by varying key inputs. In this way, key sensitivities on the model results can be investigated, and scenarios most consistent with the constraining subsurface information can be analyzed. Additionally or alternatively, the sediment fill volume may be provided as a plurality of cells in at least three dimensions (with a fourth dimension characterizing the time dimension). In such circumstances, each cell may represent at least one characteristic of sedimentary fill within the geologic basin.

As indicated in FIG. 1, predictive models are applied at 112 to the sediment fill volumes to provide at least one play-element volume. The models applied may be of various types, including physics-based models of geologic processes, logical relationships incorporating conditional probabilities (such as Bayesian-logic based models), parametric models applying empirical principles (such as relying on quantification of "rules of thumb" that are based on our scientific understanding of the physical processes that control play element adequacy and distribution), and combinations of these models. Each play-element volume provides at least a three dimensional representation of at least one play element. For each of a plurality of locations within the geologic basin and within the sediment fill volume, each play-element volume represents the qualities of the play element and the probability that the play element satisfies determined criteria. The hydrocarbon play elements that may be represented in the play-element volumes include: source rock, reservoir presence, reservoir quality, hydrocarbon seal, organic maturation, hydrocarbon migration, hydrocarbon yield, and trap regime. Each play-element volume may represent qualities and/or probability of adequacy for one or more of these play elements or other play elements. Play element adequacy may be predicted on the basis of characteristics such as environment of deposition, paleo-climatic conditions, lithologic properties, burial history, and structural position within the basin volume. In some implementations, the play-element volumes may constitute a plurality of cells in three- or four-dimensions, representing the characteristics of the locations of the cell in three dimensions and, optionally, over a fourth dimension of time.

The resultant play-element volume can be visualized in 3D space and may be interrogated by geoscientists to identify favorable areas for hydrocarbon accumulation. The play-element volumes may be analyzed in a variety of other manners to define at least one play-concept volume, such as illustrated at 114 in FIG. 1. For example, each play-concept volume may provide an at least three dimensional representation of a hydrocarbon play in a subsurface formation. Each of a plurality of locations within the play-concept volume is attributed with properties to represent: 1) an identification of each play element associated with the location, 2) the qualities of each play element associated with the location, 3) the probability for each play element that the play element satisfies determined criteria, and 4) a composite likelihood that the location represents a hydrocarbon play. In some implementations, the play-concept volume may represent the various locations by way of a plurality of three or four dimensional cells, which may correspond to the cells of the play-element volumes and/or to the cells of the sediment fill volume.

In some implementations, play-recognition technology may be applied to the play-element volume to assist the geoscientist in highlighting portions of the sediment fill volume that are favorable for hydrocarbon exploration. The play-recognition technology may be adapted to analyze the play-element volumes to recognize meaningful spatial-temporal patterns among play elements that could be missed by visual inspection alone, such as visual inspection of multiple play-element maps prepared according to conventional methods. The play-recognition technology, which will be explained further in connection with subsequent figures, may incorporate expert analytical methods or techniques embedded within a computerized system to provide a systematic query capability that can be applied to any play-element volume. As one example, the uncertainties that characterize the predicted sediment fill volume and the play-element volumes may be analyzed by the computerized system to quantify the probability of occurrence of the identified play concepts and play elements. For example, the composite likelihood that a location in the play-concept volume represents a hydrocarbon play may be determined at least in part by one or more of the temporal and spatial relationships between one or more of the play elements associated with the location and the play elements associated with neighboring locations.

The computerized system introduced here may be used together with the play-concept volumes, play-element volumes, and/or the sediment fill volumes to identify the range(s) of geologic conditions required to give rise to a given play element or play concept realization. Additionally, the computerized system may produce standard summary outputs (such as conventional play maps, play-element charts, etc) in addition to the play-concept volumes described herein.

As introduced above, the present methods may be accomplished, at least in part, through the use of computerized systems. It will be appreciated that the present methods may be implemented in a variety of computer-system configurations including hand-held devices, multiprocessor systems, microprocessor-based or programmable-consumer electronics, mini-computers, mainframe computers, workstations, and the like. Any number of computer-systems and computer networks are therefore acceptable for use with the present technology. The present methods may be practiced in distributed-computing environments where tasks are performed by remote-processing devices that are linked through a communications network. In a distributed-computing environment, the software may be located in both local and remote computer-storage media including memory storage devices. Additionally, unless specifically stated otherwise, it is appreciated that discussions herein utilizing terms such as "processing," "computing," "calculating," "determining," or the like refer to the action and/or processes of a computer or computing system, or similar electronic computing device, that manipulate and/or transform data, which is representative of physical characteristics of the subsurface, within the computing system's registers and/or memories into other data, similarly representative of physical characteristics of the subsurface, within the computing system's memories, registers or other such information storage devices.

Figure 2:
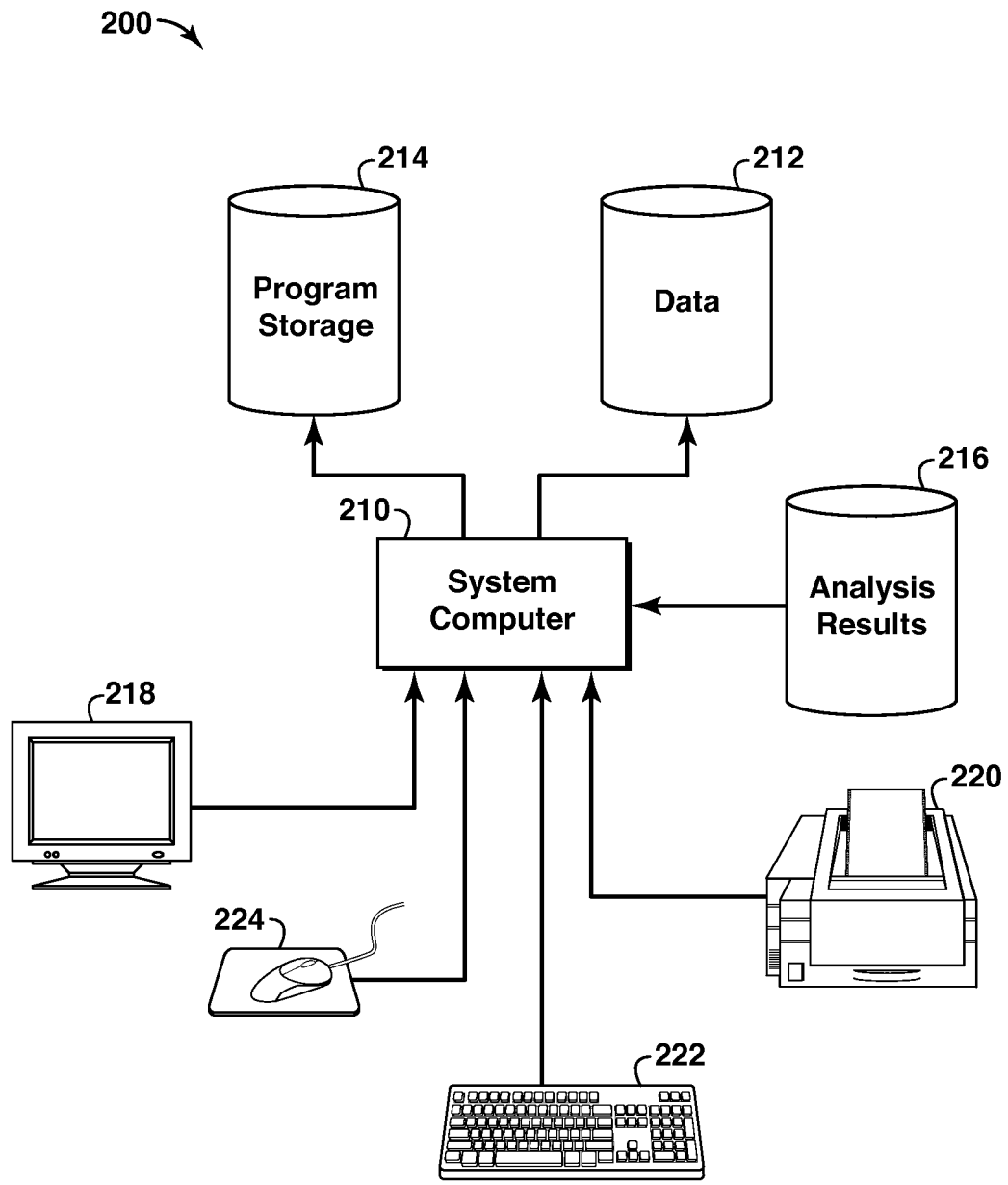
FIG. 2 is a schematic representation of a system within the scope of the present disclosure.

FIG. 2 illustrates a simplified computer system 200, in which methods of the present disclosure may be implemented. The computer system 200 includes a system computer 210, which may be implemented as any conventional personal computer or other computer-system configuration described above. The system computer 210 is in communication with representative data storage devices 212, 214, and 216, which may be external hard disk storage devices or any other suitable form of data storage. In some implementations, data storage devices 212, 214, and 216 are conventional hard disk drives and are implemented by way of a local area network or by remote access. Of course, while data storage devices 212, 214, and 216 are illustrated as separate devices, a single data storage device may be used to store any and all of the program instructions, measurement data, and results as desired.

In the representative illustration, the data to be input into the systems and methods are stored in data storage device 212. The system computer 210 may retrieve the appropriate data from the data storage device 212 to perform the operations and analyses described herein according to program instructions that correspond to the methods described herein. The program instructions may be written in any suitable computer programming language or combination of languages, such as C++, Java and the like. The program instructions may be stored in a computer-readable memory, such as program data storage device 214. The memory medium storing the program instructions may be of any conventional type used for the storage of computer programs, including hard disk drives, floppy disks, CD-ROMs and other optical media, magnetic tape, and the like.

While the program instructions and the input data can be stored on and processed by the system computer 210, the results of the analyses and methods described herein are exported for use in identifying hydrocarbon plays. For example, the play-element volume and/or the play-concept volume may exist in data form on the system computer and may be exported for use in identifying the hydrocarbon plays. For the purposes of the present disclosure, exporting refers to storing one or more volumes for machine interpretation and/or displaying one or more volumes for visualization by geoscientist(s), which visualization may be in three- or four-dimensions. For example, one or more of the play-element volume(s) and the play-concept volume(s) may be presented in geographic space and/or in Wheeler space. Additionally or alternatively, one or more aspects of the volume(s) may be presented in two-dimensional space for visualization. Still additionally, one or more of the volumes may be exported to a data storage device or a portion of a data storage device for access by the system computer 210 or another computer in identifying hydrocarbon plays.

According to the representative implementation of FIG. 2, the system computer 210 presents output onto graphics display 218, or alternatively via printer 220. Additionally or alternatively, the system computer 210 may store the results of the methods described above on data storage device 216, for later use and further analysis. The keyboard 222 and the pointing device (e.g., a mouse, trackball, or the like) 224 may be provided with the system computer 210 to enable interactive operation. As described herein, the volumes produced by the present methods may be presented in three or four dimensions. Accordingly, the graphics display 218 of FIG. 2 is representative of the variety of displays and display systems capable of presenting three and four dimensional results for visualizations. Similarly, the pointing device 224 and keyboard 222 are representative of the variety of user input devices that may be associated with the system computer. The multitude of configurations available for computer systems capable of implementing the present methods precludes complete description of all practical configurations. For example, the multitude of data storage and data communication technologies available changes on a frequent basis precluding complete description thereof. It is sufficient to note here that numerous suitable arrangements of data storage, data processing, and data communication technologies may be selected for implementation of the present methods, all of which are within the scope of the present disclosure.

Returning to the flow chart 100 of FIG. 1, it can be seen that the methods 100 include exporting at least one of the play-element volume(s) and the play-concept volume(s) at 116, which may include presenting the volume(s) for visualization at 117. As described above, exporting the volumes may include a variety of suitable steps for exporting the data representing the volume to a form or medium useable in identifying one or more hydrocarbon plays. In some implementations, exporting may include simply providing data to another routine, sub-routine, or other process of a computer program. Additionally or alternatively, exporting may include providing data in a converted form or format useable by the program that generated the volume and/or by other program(s). Still additionally or alternatively, exporting the play-element volume(s) and/or play-concept volume(s) may include presenting the volume(s) for visualization by one or more geoscientists, which may be in two, three, or four dimensions, and which may be in geographic space and/or Wheeler space.

FIG. 1 further illustrates that the play-element volume and/or the play-concept volume may be utilized to identify hydrocarbon plays within the geologic basin, at 118. The volume(s) may be viewed by geoscientists in two, three, or four dimensions for identification of hydrocarbon plays. Additionally or alternatively, the volume(s) may be processed by systems adapted to interpret some or all of the volume(s) to identify hydrocarbon plays.

As introduced above, FIG. 1 further illustrates that the methods 100 may optionally include geobody-related steps 120 to define and utilize a geobody. The development and utilization of a geobody may be one manner in which the data developed through the present methods may be utilized in identifying hydrocarbon plays. Geobodies may be defined for play-element volumes and/or for play-concept volumes. In the context of a play-element volume, play-element geobodies may be defined around groups of locations, cells, point sets, etc. that are characterized by common or similar properties for a given play element. Similarly, in the context of play-concept volumes, play-concept geobodies may be defined around locations, cells, etc. that are characterized by common or similar properties. For example, clusters of adjacent locations or cells that present a common or similar composite likelihood of representing a hydrocarbon play could be grouped or defined in a single play-concept geobody. As illustrated in FIG. 1, the geobodies are exported at 124 and utilized in identifying hydrocarbon plays at 126. The geobodies may be exported in any suitable manner, such as described above, including presenting the geobodies for visualization by geoscientists and/or for processing by computing systems adapted to interpret geobodies in the identification of hydrocarbon plays. When presented for visualization, play-concept geobodies may be co-rendered with related play-element geobodies. Rendered color and/or transparency of play-concept geobodies may be set by any of the properties represented by the play-concept volume locations. For example, the property(ies) that the geobody's locations have in common may be presented in the visualization and varied in color and/or transparency to illustrate differences between the locations in that property. Additionally or alternatively, the colors and/or transparency of a play-concept geobody and/or a play-element geobody may be set by one or more of the properties presented by the locations of the play-element volume. The visualization and/or interpretation of the geobodies, particularly when combined with examining the play-concept volumes and the play-element volumes assists the exploration team to form a very deep and comprehensive understanding of potential play opportunities within the basin.

Figure 3:
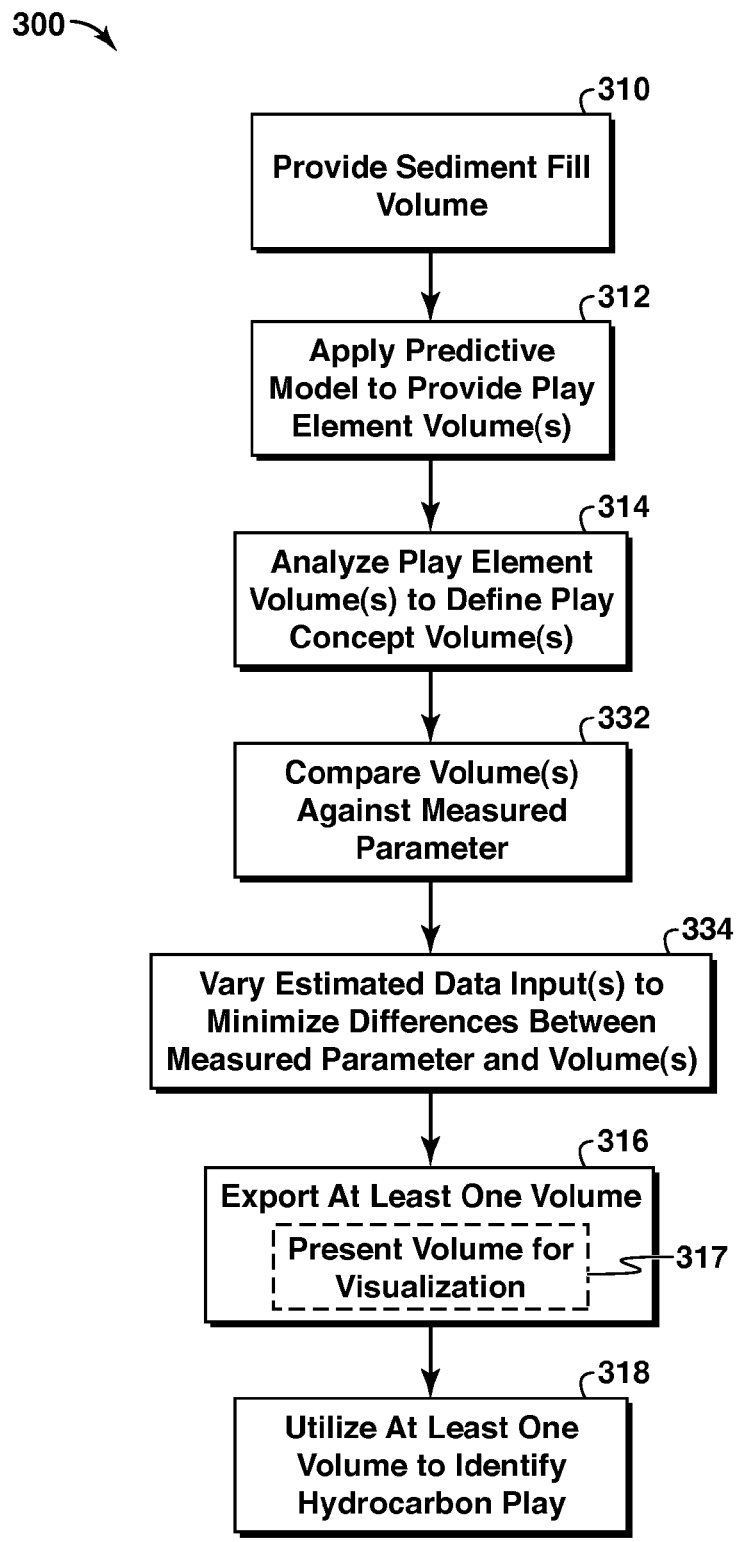
FIG. 3 is a schematic flow chart of methods within the scope of the present disclosure.

FIG. 3 presents a flow chart of related methods within the scope of the present invention. More particularly, the methods of FIG. 3 present a calibrated method 300 adapted to improve the accuracy of the play-element volumes and/or the play-concept volumes. As seen in FIG. 3, many of the steps or features of the calibrated method 300 are similar and/or identical to the steps of the methods 100 described in connection with FIG. 1 and in such instances are referred to by similar reference numerals. For example, the calibrated methods 300 provide a sediment fill volume at 310, apply predictive models to provide play-element volume(s) at 312, analyze play-element volumes to define play-concept volume(s) at 314, export volume(s) at 316 (which may include presenting the volume(s) for visualization at 317), and utilize the volume(s) to identify hydrocarbon play at 318, each of which may be in accordance with the description provided above and/or in accordance with the further details provided below. Additionally, the calibrated methods 300 include the step of comparing one or more volumes against a measured parameter at 332 and varying estimated data inputs to minimize differences between the measured parameter and the compared volume at 334.

Continuing with FIG. 3, it should be understood that the sediment fill volume and/or the predictive models used to provide the play-element volumes may be based at least in part on estimated data. The estimated data inputs may be related to historical conditions and events and/or to current conditions in the subsurface. In the event that one or more of the estimations in the estimated data inputs is erroneous, the error can propogate through to the play-element volumes and/or the play-concept volumes rendering even the most expert interpretation and prediction of hydrocarbon plays inaccurate. In some implementations, the inaccuracy may result in a play prediction that is significantly more attractive than reality. In other implementations, the inaccuracy may result in a play prediction that is significantly less attractive than the reality. Both scenarios are undesirable. Of course, the quality of the estimated data inputs can be improved through improved training and experience of the geoscientists making the estimations, which is continually encouraged.

Additionally, in some implementations, the risk of inaccurate or erroneous estimated data inputs may be incorporated into the play-element volume(s) and/or play-concept volume(s) of the present methods. For example, the estimated data input may be associated with an estimation probability, each of which may be incorporated into the play-element volumes and/or the play-concept volumes. As described above, each of the play-element volumes includes a representation of the probability that the represented play element(s) satisfy determined criteria. The probability that a represented play element satisfies determined criteria may be based at least in part on the estimated data inputs and/or the associated estimation probability. Additionally or alternatively, the composite likelihood that a location in the play-concept volume(s) represents a hydrocarbon play (one of the attributes represented by the play-concept volume(s)) may be based at least in part on the estimated data inputs and/or the associated estimation probability. Accordingly, geoscientists and/or the computer programs used by geoscientists will be able to account for the risk of inaccuracy in one or more of the estimated data inputs.

While accounting for inaccuracy is an improvement over prior systems and methods and constitutes some aspects of the present invention, elimination of inaccuracies is preferred over awareness of a potential inaccuracy. The calibrated methods 300 of FIG. 3 provide an exemplary method for improving the accuracy of the various volumes utilized in the present methods. Measured parameters may be obtained in a variety of methods including conducting additional surveys (seismic, gravity, magnetic, etc.), drilling exploration wells, obtaining samples from nearby and/or neighboring wells, such as existing production and/or injection wells, etc. The measured parameters that may be obtained are diverse and may be related to the sediment fill volume(s), the play-element volume(s), and/or the play-concept volume(s). Any measurable parameter that can be related to an input to one or more of the volumes may be used for comparison with the volume(s). For example, the sediment fill volume may be constrained by measured parameters related to the sand, silt, and/or shale fractions, such as may be obtained from neighboring existing wells and/or an exploration well in the basin. The measured parameter(s) may then be compared to one or more of the volumes to consider the fidelity of the volume with the actual measured conditions. One or more of the estimated data inputs may then be varied, either manually by geoscientists or automatically by computer algorithms, until the differences between the measured parameter(s) and the volume(s) is minimized. In some implementations, multiple estimated data inputs may be varied systematically to test the sensitivities of the volume(s) to the estimated data inputs and/or to determine the right combination of estimated data inputs to minimize the differences between the volume(s) and the measured parameter(s). When multiple measured parameters, multiple volumes, and/or multiple estimated data inputs are being considered in the efforts to calibrate the volume(s) to the measured parameter(s), a systematic method for varying the estimated data inputs may be preferred and a computerized method may be more preferred. While the experience and judgment of experts may accomplish the calibration methods described herein, computerized methods incorporating Bayesian logic may facilitate the calibration methods 300.

Figure 4:
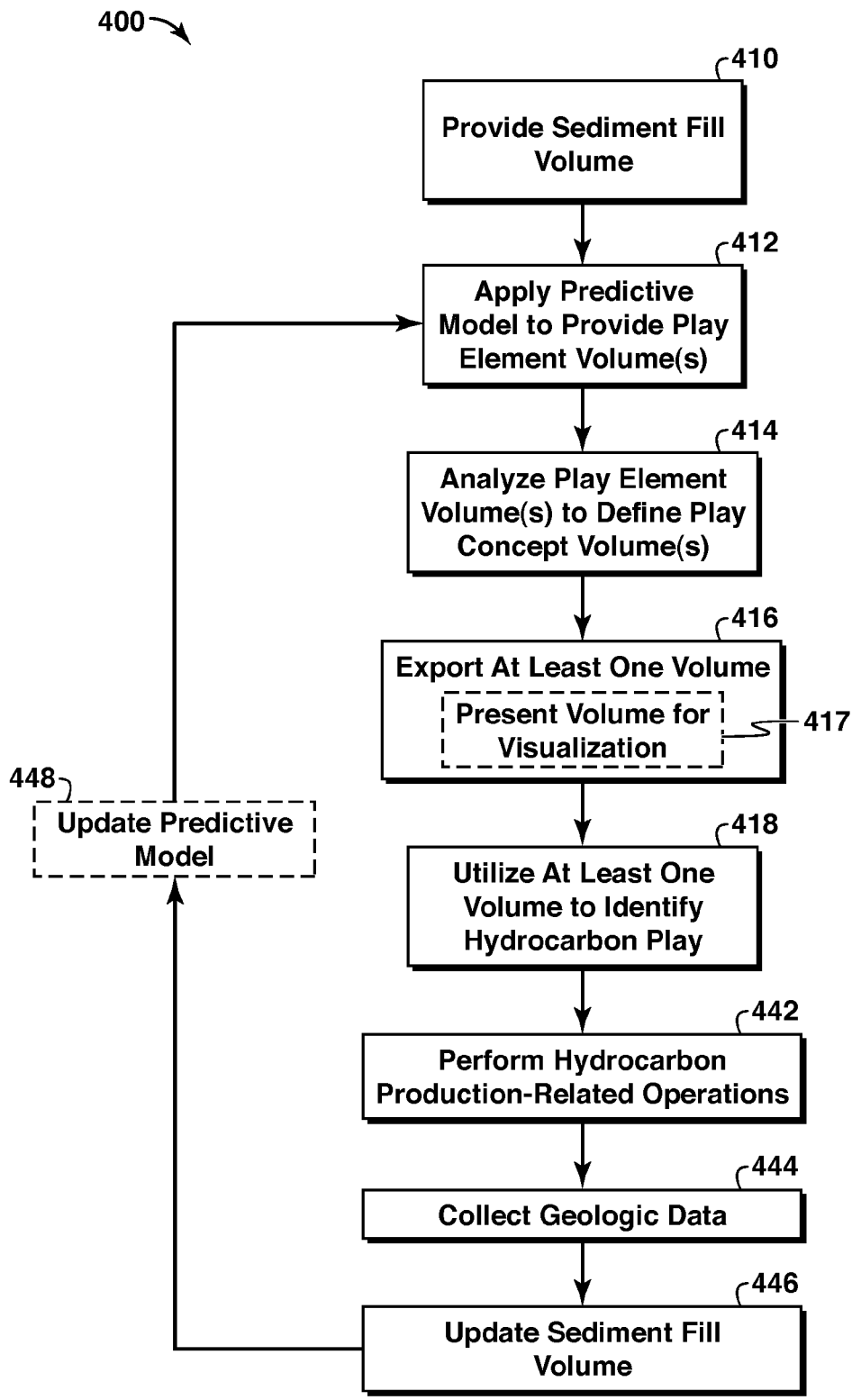
FIG. 4 is a schematic flow chart of methods within the scope of the present disclosure.

FIG. 4 provides a schematic flow chart 400 illustrating additional variations on the methods 100 of FIG. 1, which variations are adapted to address the challenges presented by the need for estimated data in developing the volumes of the present methods. Similar to the discussion of FIG. 3, steps and/or features that are similar to or analogous to features or steps described in FIG. 1 are given similar reference numbers. For the purpose of brevity, such features will not be described in connection with FIG. 4. More specifically, steps 410, 412, 414, 416, 417 and 418 may be as described in connection with FIG. 1, mutatis mutandis. Additionally, FIG. 4 illustrates that the methods may include performing hydrocarbon production-related operations at 442, such as may be conducted in the geologic basin represented by the sediment fill volume. During the production-related operations, which may include drilling, producing, injecting, treating, etc., geologic data may be collected at 444. The collection of geologic data at 444 may be one method of obtaining the measured parameter(s) discussed in connection with FIG. 3. The geologic data may be collected in a variety of manners, including collecting core samples, interpreting depositional facies, lithology, stratigraphic age, etc. from core, log, and/or seismic data, and other conventional techniques. The collected geologic data may be used in updating the sediment fill volume, as indicated at 446. For example, the geologic data may be used to revise one or more estimated data inputs as described above. Additionally or alternatively, the collected geologic data may be used to update the models, assumptions, and/or logic applied to develop the sediment fill volume of the geologic basin. For example, a sediment fill model, including one or more of the equations and/or relationships that constitute the model, may be updated based at least in part on the collected geologic data.

In some implementations, the methods of the present disclosure may be repeated following the updating of the sediment fill volume, such as illustrated in FIG. 4. Additionally or alternatively, some implementations may include updating the predictive model based at least in part on the collected geologic data, such as illustrated optionally at 448 in FIG. 4. Similar to the discussion related to the updating of the sediment fill volume, the predictive models may be updated to provide play-element volumes that better correspond to the collected geologic data. As discussed herein, the predictive models utilized to provide the play-element volumes may include a variety of modeling technologies, including physics-based computational models, parametric-empirical models, parametric-physics models, and Bayesian-logic models, any of which may be updated based at least in part on the collected geologic data. While FIG. 4 representatively illustrates updating of the sediment fill volume and the predictive model(s), the collected geologic data may be used to update any of the operations of the present methods leading up to the utilization of the volume(s) in the identification of hydrocarbon plays. For example, when computerized systems are used to analyze play-element volumes and to define play-concept volume(s), the methods applied by the computerized systems may be updated based at least in part on the collected geologic data.

Figure 5:
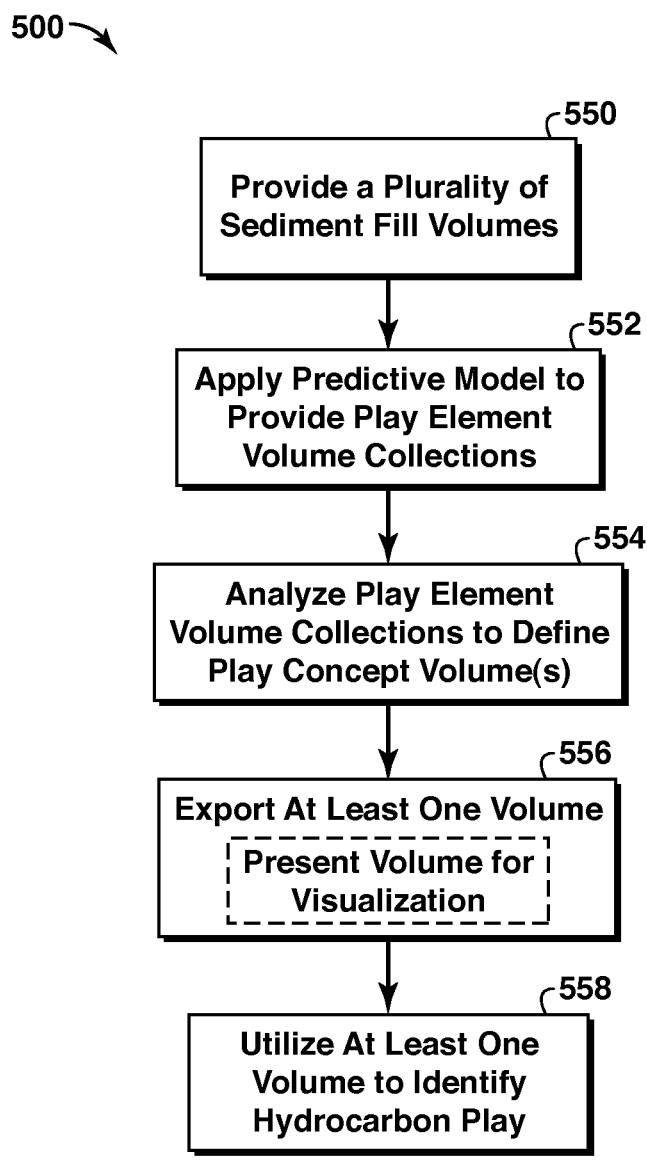
FIG. 5 a schematic flow chart of methods within the scope of the present disclosure.

FIG. 5 provides another schematic flow chart 500 illustrating methods within the scope of the present disclosure. The methods of FIG. 5 are analogous to the methods described in connection with FIGS. 1-4 above and may be adapted to incorporate any of the variations described above. Additionally, the methods of FIG. 5 are adapted to provide yet additional methods for addressing uncertainties in estimated data when modeling the evolution of the subsurface over geologic time. Specifically, the methods of FIG. 5 consider a plurality of evolutionary theories or possibilities when developing the sediment fill volume. As indicated in FIG. 5, the methods include providing a plurality of sediment fill volumes at 550. As in other descriptions above, the sediment fill volume may be based at least in part on known data and on estimated data. In some implementations, the estimated data may relate to one or more of the various distributions and histories (lithology, sediment age, depositional conditions, burial, erosion, compaction, etc.) represented in the sediment fill volume. A plurality of sediment fill volumes may be provided with each sediment fill volume being based on or incorporating differing estimated data inputs regarding the evolution of the basin, such as the various distributions and histories within the basin.

For example, a given geologic basin may be data constrained in a number of parameters leaving parameters related to one or more depositional conditions unknown. In addition to the various methods presented above for dealing with the uncertainty of the unknown depositional conditions parameters, a plurality of sediment fill volumes may be provided with each sediment fill volume incorporating different scenarios or combinations of estimated data inputs regarding the parameters for the depositional conditions. Due to the number of parameters that inform the provision of the sediment fill volume(s), the number of sediment fill volumes that may be prepared to account for the unconstrained parameters may be large. Expertise, experience, and computerized systems may facilitate the identification of which estimated data inputs to address through the development of multiple sediment fill volumes. Similarly, and as discussed above, Bayesian-logic may be incorporated to determine the number of sediment fill volumes necessary to adequately represent the geologic basin and the manners in which to vary the estimated data inputs.

Continuing with the schematic flow chart 500 of FIG. 5, the methods may include applying predictive models, which may be as discussed elsewhere herein, to the sediment fill volumes to provide a plurality of play element collections, illustrated at 552. Each collection may correspond to one of the sediment fill volumes. Additionally or alternatively, a plurality of play-element volume collections may be provided for a sediment fill volume. For example, different assumptions or theories may be applied at the predictive model stage to develop multiple play-element volume collections for a sediment fill volume. Additionally, the play-element volume collections may be analyzed, such as described elsewhere herein, to define play-concept volumes, at 554. At least one play-concept volume may be defined for each play-element volume collection. Accordingly, each play-concept volume corresponds to differing estimated data inputs regarding the evolution of the basin. While differing estimated data inputs may be incorporated into the methods at the sediment fill volume stage and/or the play-element volume stage, additional or alternative estimated data inputs may be considered in developing and defining the play-concept volume, possibly resulting in multiple play-concept volumes for each play-element volume collections.

As described above, the methods of FIG. 5 potentially expand to provide a multitude of sediment fill volumes, play-element volumes, and play-concept volumes adapted to represent the various possibilities in the evolutionary history of the basin. The use of computerized systems may facilitate working with such an expansive number of models and volumes. Additionally, logic such as Bayesian theories may be applied to apply the right degree of variation to the right parameters at the right stages of the present methods. Computerized systems incorporating such Bayesian logic may facilitate the present methods making them computationally efficient. In some implementations, constraints on the number of variations and parameters to be varied may be required to make the methods of FIG. 5 computationally viable and/or tractable. In any event, the volumes of FIG. 5 are exported, as described above, at 556 and utilized to identify at least one hydrocarbon play at 558. In some implementations, the methods of FIGS. 1-5 may be adapted and incorporated together in the modeling of a single geologic basin. For example, a plurality of sediment fill volumes may be provided to address estimated data in some parameters while collection of geologic data may be used to update one or more sediment fill volumes to address the same or other parameters.

As can be understood from the foregoing discussion, the present systems and methods may enable geoscientists, possibly through the use of computer systems, to test a multitude of the possible evolutions that may affect the development of hydrocarbon plays. For example, variations in the many factors affecting the sediment fill of the geologic basin may be captured in the play-element volumes and/or the play-concept volumes and the risks and probabilities of those factors may be similarly captured in the volumes. Additionally or alternatively, the present methods may enable the geoscientists may, through the use of the methods of FIGS. 1-5, determine that one type of estimated data input is more relevant to identification of hydrocarbon plays than other type of data. For example, when a plurality of sediment fill volumes are provided, the play-element collections may be substantially identical across the plurality of collections except for, as an example, the organic maturation play-element volume, which may vary widely between two or more of the collections. In such an implementation, the geoscientists are able to determine that collecting geologic data related to organic maturity and/or further, more rigorous study to improve the estimated data inputs regarding organic maturity may determine which of the play element collections is most right and/or identify a new play-element volume collection that is most accurate in all play elements. Accordingly, geoscientists may be aided in directing their studies and their exploration efforts.

Additionally or alternatively, the present systems and methods provide objective metrics by which multiple geologic basins and/or multiple portions of one or more geologic basins may be compared to identify analogous plays. Geoscientists have attempted identify analogous play elements in differing prospects for many years, often being disappointed due to the high levels of estimation and interpretation required to develop the conventional play element maps and the uncertainties introduced thereby. However, the methods and systems of the present disclosure provide objective data sets, in the form of sediment fill volumes, play-element volumes, and play-concept volumes that enable the degree of similarity between different play concepts to be fairly judged. Importantly, these volumes may incorporate and represent the probabilities and uncertainties allowing comparison of the underlying play element qualities and the respective probabilities. The comparison of different play concepts or prospects using the objective data of the present systems and methods may be carried out not only for plays within one basin or implementation of the present technologies, but across all basins and plays that have been analyzed through the present technologies. The comparisons may be done utilizing computerized systems to compare data to data and/or the comparisons may be presented for visualization by geoscientists for identification of analogs and/or confirmation of computerized analog identifications.

While several features and aspects of the present systems and methods can be understood from the discussion above and FIGS. 1-5, additional features and aspects can be understood from the following discussion of exemplary implementations. In the discussion below, some features and aspects will be explicitly related to the foregoing discussion and FIGS. 1-5 while the relationship of other features and aspects to FIGS. 1-5 will be implicitly understood by those of skill in the art. While the following discussion provides more specific examples of representative implementations, it is not intended to limit the claims below or the breadth of the discussion above.

As may be understood from the foregoing discussion, the present systems and methods may be employed by integrated exploration teams or other geoscientists in both mature and frontier exploration settings. The present systems and methods assist the geoscientists in rapidly developing a shared, integrated understanding of potential play opportunities in a geologic basin and revising that understanding as new information becomes available. In implementations of the present systems and methods of the present disclosure, the geoscientists may use the present technology in a variety of manners, including using the technology to: 1) gain fundamental understanding of the geologic basin and its sensitivities, including any hydrocarbon systems within the geologic basin; 2) improve recognition of and attention to all, or at least substantially all, play concepts within the basin rather than merely the first several play opportunities to be identified; 3) identify meaningful play-element and play-concept analogs to facilitate application of learnings from one implementation to the next; 4) perform scenario analysis linking estimated data uncertainties and/or model and/or interpretation uncertainties to various play scenarios and play-concept volumes; 5) design work-plans to efficiently identify and address key uncertainties, whether in the estimated data inputs or in the models or interpretations; and 6) iteratively guide data acquisition and exploration strategy to improve the play-concept volumes.

It may further be understood from the foregoing discussion that the present systems and methods include several features and aspects that alone and collectively are improvements over the conventional practice. Non-limiting examples of such improvements include the use of sediment-fill modeling to predict the 3D (and 4D, including evolution through geologic time) distribution of at least substantially all relevant hydrocarbon play elements at basin-wide scale. Heretofore, sediment-fill modeling applications have focused on delineating reservoir distribution without regard to other play elements and have for the most part treated prospect- or field-scale problems rather than basin-scale problems. This approach assures mutual geologic consistency in the interpretation of the several play elements throughout the basin. Additionally, as new information is obtained in the exploration or operation of a particular play in a basin, that information can be incorporated into the basin-wide sediment fill volume to improve the accuracy of the play-concept volumes throughout the basin.

An additional or alternative non-limiting example includes the integration of Bayesian belief networks, or Bayesian logic, into the determination and delineation of play-element presence and quality, explicitly capturing model and/or estimated data input uncertainty in play-element probability. Yet another additional or alternative non-limiting example includes the automatic identification, characterization, and depiction, in 3D or 4D, of the play concepts that may be inferred from the play-element volumes identified in the basin, while also facilitating examination of those play elements for additional play concepts. Still further, additional or alternative non-limiting examples of improvements include the integration of geologic and model uncertainty across possible multiple scenarios of basin evolution (multiple geologic interpretations of basin history) to quantify play risk and the provision of metrics associated with each play to provide an objective measure of play analogs across numerous basins and/or plays.

Sediment Fill Volumes

The sediment fill volumes introduced and described above may be a three dimensional volume, or ideally a four dimensional volume with a time sequence of geologic history, of the sedimentary fill of a basin or portion of a basin. Throughout the sediment fill volume, whether by voxet, grid cell, or as a point set, the sediment fill volume describes critical characteristics of the sediment fill, which may include such characteristics as lithology distribution, sediment age distribution, depositional conditions distribution, burial history, erosion history, and compaction history.

Suitable sediment fill volumes useful in the present system and methods may be constructed in a number of ways. Most simply, they may be constructed by interpolation among a number of interpreted cross-sections and/or horizon maps, with or without stochastic effects. A more detailed sediment fill volume may be based on a 3D seismic data volume, with one or more of the characteristics inferred from seismic attributes and geometries. Geologic time can be included in four dimensional sediment fill volumes through consideration of well or interpretive stratigraphic information. In either of these methods, the 4D geologic history may be constructed using any of various conventional back-stripping techniques.

Without being bound by presently held theories, it is presently believed that an exemplary preferred mode of obtaining a sediment fill volume is by means of a Sediment-Fill Forward Model. Exemplary models are described in various sources, including: Granjeon, D. and Joseph, P., 1999, Concepts and applications of a 3D multiple lithology, diffusive model in stratigraphy modeling, in W. J., Harbaugh, Watney, W. L., Rankey, E. C. et al., eds., Numerical Experiments in Stratigraphy: Recent Advances in Stratigraphic and Sedimentologic Computer Simulations, SEPM Special Publications 62; and Watney, W. L., Rankey, E. C. and Harbaugh, J. W., 1999, Perspectives on stratigraphic simulation models: current approaches and future opportunities, in W. J., Harbaugh, Watney, W. L., Rankey, E. C. et al., eds., Numerical Experiments in Stratigraphy: Recent Advances in Stratigraphic and Sedimentologic Computer Simulations, SEPM Special Publications 62. Such a model uses a process-based and rule-based forward modeling technique and a set of boundary conditions to model the evolution of the sedimentary fill of a basin through geologic time. Such a model, appropriately conditioned by data or interpretation for the basin of interest, provides the time evolution of the spatial distribution of sediment properties within the basin at sufficient level of detail. Importantly, the process-based approach permits the construction of a valid range of models beyond any region of local data control in a manner that is geologically consistent with available data control.

A number of sediment-fill forward modeling tools exist which can be adapted to the requirements of the Invention. One currently available tool that meets the requirements very well is Dionisos (Diffusive Oriented-Normal and Inverse-Simulation of Sedimentation), initially developed at Institut Francais du Petrol and now marketed by and available from Beicip-Franlab. U.S. Pat. No. 7,043,367 discloses systems and methods associated with the Dionisos tool and is incorporated herein by reference in its entirety for all purposes. Dionisos employs a combination of diffusion process physics and parametric rules to model the transport, deposition, and erosion of silici-clastic and/or carbonate sediment of various grain-size classes. It produces, for any time in the history of the basin, a cell-based volume of the sediment fill in which each layer of cells corresponds to a specific time-interval in the basin stratigraphy. Properties associated with each cell record the depositional and current attributes of the sediments occupying that cell (e.g., lithology or grain-size proportions, thickness, current and depositional environmental conditions such as water depth or elevation, structural dip, etc.). Dionisos is one example of a software package capable of providing sediment fill volumes for use in the present methods. Those of ordinary skill in the art will recognize other software packages and/or other methods for providing sediment fill volumes for use in the present system and methods. While some concepts regarding the use of Dionisos to produce sediment fill volumes will be provided herein, its use and functionality is considered to be understood by those of skill in the art. In some implementations, the sediment fill volumes may be obtained from an archive or storage of sediment fill volumes previously generated using Dionisos or other means.

The methods and systems of the present disclosure, in some implementations, may be considered to exploit the rock and environmental properties (properties describing sedimentary settings, qualities, and physical conditions, and their evolution through time) provided by the sediment fill volume to determine potential distribution and quality of play elements throughout the basin.

Sediment Fill Volume Calibration

As can be understood from the foregoing discussion, the sediment fill volume provides the basis for the remainder of the present systems and methods. Sediment fill volumes may be provided in a number of contexts or settings in which it is desirable to identify hydrocarbon plays. For example, the present systems and methods may have application in basins where geoscientists have access to a great deal of geologic data (e.g., in a currently producing basin where more plays are believed to exist) and in basins where relatively little geologic data is available (e.g., in previously untapped basins being explored for the first time). Depending on the circumstances in which the present systems and methods are utilized, it may be said that the sediment fill volume is generated in either a purely "conceptual mode" (e.g., where little geologic data is available) or in a "constrained mode" (e.g., where reasonable geologic data control is available).

In circumstances or applications where constraining geologic data are not available or not critical to the "conceptualization" objectives of the geoscientists, the present systems and methods may be used to extrapolate understanding from one region into another region over long distances where the other region has a different but genetically related geologic history. In the conceptual mode, the present systems and methods may facilitate rapid construction of multiple play-concept scenarios based on the fundamental genetic understanding of the basin. In some implementations operating in the more conceptual mode, rigorous data-matching may not be necessarily required, as this can be counter-productive to the objective of new idea generation where direct observations are limited. In conceptual mode, for example, the geoscientists may quickly evaluate the sensitivity of the play potential to multiple tectonic/subsidence or sediment-supply scenarios while holding other controls constant. By quickly generating a series of predictions with reasonable geologic scenarios, the geoscientists would be able to recognize and consider the potential play types and to determine whether additional application of the present systems and methods is warranted to better constrain the concepts. As one example, the operation in the conceptual mode may be similar to the discussion above in connection with FIG. 5 where multiple sediment fill volumes are provided and play-concept volumes are generated for each sediment fill volume. While the present systems and methods typically operate in three or four dimensions, the introductory nature of the conceptual mode may warrant application of the present systems and methods in two dimensions initially, which can significantly reduce the time required to construct and run the model(s), followed by three or four dimensions after the initial conceptual application.

The constrained mode introduced above may be appropriate where the sediment forward model used to generate the sediment fill volume is expected or desired to honor important constraining data (such as data obtained from wells, surveys, and/or maps) to a desired level of fidelity. In data-poor areas, a limited number of geologic cross-sections or maps may serve as the calibration constraints. In more data-rich areas, existing basin models, geologic models, or seismic impedance volumes may serve as calibration constraints for the sediment fill volume. Operation in a constrained mode may be desirable in situations where available data suggests a possible play, but greater confidence through utilization of the present systems and methods is desired. For example, the ability to apply the present systems and methods in "constrained mode" may allow identification of overlooked opportunities in existing ventures of advanced exploration maturity and richness of available data (e.g., deeper play potential or play extensions). In many applications the sediment-fill problem will be weakly to strongly constrained by observed or interpreted data.

Utilization of a sediment-fill model, such as Dionisos, requires several data inputs, some of which may be known data inputs and some of which may be estimated data inputs. At a fundamental level, four types of data may be input into a sediment-fill model to develop or provide a sediment fill volume, including: (1) a history of eustasy (temporally varying sea level), (2) a history of basin subsidence (spatially and temporally varying), (3) a history of sediment supply (spatially and temporally varying), and (4) an understanding of the compaction of sediments of various lithologies in response to burial depth or effective stress. Each of these data inputs may be obtained through methods and means understood by those of ordinary skill in the art.

For introductory purposes, each of these data types and exemplary methods of obtaining such data is described here. While eustasy may be more difficult to obtain at fine-scale resolutions, for the present systems and methods where basin- and play-scall modeling is desired, eustasy is well known. See, for example, Haq, B. U. (1991) Sequence stratigraphy, sea-level change, and significance for the deep sea. In Sedimentation, Tectonics and Eustacy (D. I. M. Macdonal, Ed.), pp. 3-39, International Association of Sedimentologists Special Publication 12.

The distribution and history of basin subsidence can be constructed using one of a variety of backstripping techniques. Exemplary techniques are described in various papers, including: 1) Karner, G. D., N. W. Driscoll, J. P. McGinnis, W. D. Brumbaugh and N. Cameron, 1997, Tectonic significance of syn-rift sedimentary packages across the Gabon-Cabinda continental margin, Marine and Petrol. Geol., 14, 973-1000; 2) Driscoll, N. W., and G. D. Karner, 1998, Lower crustal extension across the northern Carnarvon basin, Australia: Evidence for an eastward dipping detachment, J. Geophys. Res., 103, 4975-4992; 3) Karner, G. D., and N. W. Driscoll, 1999, Tectonic and stratigraphic development of the West African and eastern Brazilian Margins: Insights from quantitative basin modeling, In: "Oil & Gas habitats of the South Atlantic," Spec. Publ. Geol. Soc. Lond., 153, 11-40; 4) Karner, G. D., and N. W. Driscoll, 1999, Style, timing, and distribution of tectonic deformation across the Exmouth Plateau, northwest Australia, determined from stratal architecture and quantitative basin modeling, In: "Continental Tectonics", Spec. Publ. Geol. Soc. Lond., 164, 271-311; 5) Karner, G. D., N. W. Driscoll and D. H. N. Barker, 2003, Synrift subsidence across the West African continental margin: The role of lower plate ductile extension, In: "Petroleum Geology of Africa: New Themes and Developing Technologies", Arthur, T. J, MacGregor, D. S., and Cameron, N. R. (Eds.), Spec. Publ. Geol. Soc. Lond., 207, 105-125; 6) Cathro, D. L., and G. D. Karner, 2006, Cretaceous-Tertiary inversion history of the Dampier sub-basin, northwest Australia: Insights from quantitative basin modeling, Marine Petrol. Geol., 23, 503-526; 7) Watts, A. B. & W. B. F. Ryan, Flexure of the lithosphere and continental margin basins, Tectonophysics, 36, 25-44, 1976; 8) Steckler, M. S. & A. B. Watts, Subsidence of the Atlantic-type continental margin off New York, Earth and Planet. Sci, Lett., 41, 1-13, 1978; and 9) Falvey, D. G. & Middleton, M. F, 1981—Passive continental margins: evidence for prebreakup deep crustal metamorphic subsidence mechanism, Oceanologica Acta, vol. 4, pp. 103-114. These techniques generally are driven by interpreted sediment isopach and structure maps, which may range from considerable detail down to a few very generalized and interpretative maps. Accordingly, depending on the basin and the stage of basin development, data related to the basin subsidence may include both known and estimated data inputs.

The history of sediment supply is comprised of a time-history of rate(s) of sediment supply, source direction(s) of sediment supply, and type(s) of sediment supply (relative mixture(s) of different lithologies or grain sizes). These may be estimated from standard exploration-scale interpretation products such as isopach and environment of deposition (EOD) maps. These, in turn, may be constructed from seismic and/or drill-well interpretation. Extremely sparse data may be augmented or replaced by inferences of hinterland erosion driven by considerations of regional geology, tectonics, and paleo-climate. Exemplary methods of augmented or otherwise improving upon sparse data may be found in ExxonMobil's methods commonly referred to as Sand Generation and Evolution Model (SandGEM) and described in PCT Patent Publication WO 2006/016942 A1, which is incorporated herein by reference for all purposes. Here again, due to the number of inferences and estimations that may be required to provide the history of sediment supply, it can be understood that the sediment fill volume incorporates estimated data inputs in a number of parameters. Finally, numerous compaction functions of adequate accuracy are readily available in the literature, such as in Weissel, J. K. and G. D. Karner, 1989, Flexural uplift of rift flanks due to mechanical unloading of the lithosphere during extension, J. Geophys. Res. 94, 13,919-13,950.

Once an estimate of input to the sediment-fill model has been made, a few iterations of the model will enable the estimated data inputs to be adjusted to achieve an acceptable fidelity to the constraining data within the basin, which may be conducted similar to the methods described above in connection with FIGS. 3 and/or 4. Exemplary constraining data may include the isopach and EOD maps and may also include aspects of the stratigraphic sequence at one or more key well sites. Additionally or alternatively, a few iterations of the model in conceptual mode may enable operation of the systems and methods in a manner similar to the description of above in connection with FIG. 5. A further discussion of methods for accommodating multiple evolutionary scenarios and uncertainty of sediment-fill volumes is provided above in connection with FIGS. 3-5 and is provided below.

Figure 6:
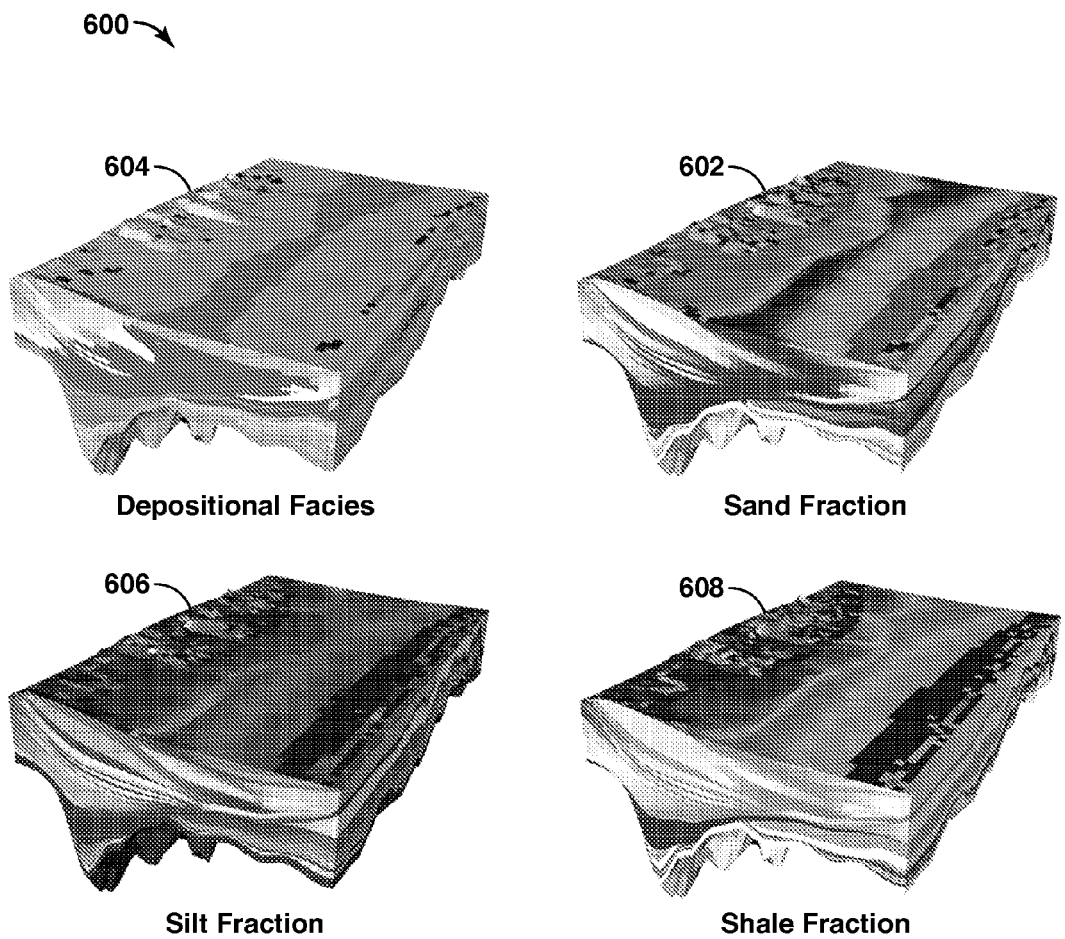
FIG. 6 provides exemplary illustrations of sediment fill volumes.

Regardless of how the sediment fill volumes are provided, the resulting sediment fill volume(s) comprise a very detailed rendering of the sedimentary basin in three and/or four dimensions. The properties of the basin that are illustrated or represented by the sediment fill volume may include one or more of lithology distribution, sediment age distribution, depositional conditions distribution, burial history, erosion history, and compaction history, among other relevant properties. FIG. 6 provides exemplary illustrations 600 of sediment fill volumes 602, 604, 606, 608 depicting properties that may be modeled through sediment fill modeling. Sediment fill volumes such as those described above and those illustrated in FIG. 6 may provide a basis from which the distributions and qualities of play elements may be determined. For the purposes of the present discussion, the Figures utilize a common representative basin having representative data and characteristics. The shape and characteristics of the sediment fill volumes, play-element volumes, and play-concept volumes will vary in each application of the present systems and methods. Therefore, the illustrations of representative volumes are intended to be exemplary only and not limiting.

Scale of Application

While introduced and referenced above, it should be observed that the present systems and methods focus on play-scale opportunity identification, rather than on prospect- or well-scale analysis. For example, as discussed above, the present systems and methods in conceptual mode may initially direct the geoscientists to potential "play fairways" with lateral dimensions of 10's to 100's of kilometers rather than to actual plays. While identification of play fairways may not be adequate as a basis for identifying individual prospective hydrocarbon traps, it is adequate to focus attention on portions of the basin without losing the connection to the basin and it allows the geoscientists to decide if and where further investigation is warranted. Input to the methods and systems then may be refined with additional knowledge, data, and modeling results (i.e., application in a more "constrained mode") to establish the quality of the play concepts (rather than the play fairways) and their geographic limits. Even after this effort, potential play opportunities may not be pinpointed in space until additional data are interpreted within the context of the new concepts.

With this scale in mind, it may be seen that the present systems and methods in some implementations do not require an extremely accurate and predictive sediment-fill model or a precise facsimile of the basin. While close fidelity is desirable, some implementations, such as the conceptual mode, require only a model of the basin that is roughly similar to the actual basin (e.g., only to the degree of a "cartoon" rendering) or a rendering of the basin that would lead to the suggestion of the same sorts of play ideas in the same sorts of places. In other implementations, the present systems and methods may be refined with a more precise sediment fill volume to enable play-scale analysis and identification of play-concept volumes. Additionally, the present systems and methods, while developed for play-scale analysis, may be extended and applied to prospect-scale analysis. For example, if we have a clear understanding of how a specific structure evolved, it may be possible through sediment-fill forward modeling to predict the quality and stratigraphic architecture of reservoirs and seals adjacent to and within the structure, and therefore the 3D location of potential subtle traps. This level of resolution in particular may require application of a more detailed process-based sediment forward-modeling program. Here again, suitable process-based sediment forward-modeling programs are available and understood by those of ordinary skill in the art, such as illustrated by Sun, T., P. Meakin, T. Jossang and K. Schwarz (1996), A Simulation Model for Meandering Rivers, Water Resour. Res., 32(9), 2937-2954.

Play-Element Volumes

The information captured and/or represented in the sediment fill volume may be used to determine the potential distributions of play elements within the basin. The distributions of play elements may be determined through application of predictive models or filters acting on one or more of the properties of the sediment-fill volume. In some implementations, the predictive models may utilize the sediment fill volume as well as additional information. Generally, these predictive models or filters act on the sediment-fill volume location by location (cell by cell, voxel by voxel, etc. depending on the configuration of the sediment-fill volume), resulting in the computation of new properties for each location. These new properties may be in the form of the qualities expected for a particular play element at the location and/or the probability associated with finding that play element above one or more threshold values of quality or other determined criteria. These new properties permit the construction of play-element volumes capturing and depicting the expected spatial and temporal variation throughout the basin of the qualities of each play element and the probabilities that each play element satisfies determined criteria.

The methods associated with the determination of play-element volumes from sediment-fill volumes may include a variety of steps and may be done in a variety of manners. For example, the geometries and properties of the sediment-fill volume(s) (whether provided by Dionisos or any similar tool) may be imported into a 3D (or 4D including a time history) visualization software system that facilitates application of software algorithms or other modeling applications to the set of sediment properties to create and define new properties characterizing play elements. In some implementations, the sediment-fill modeling software itself may play no further role in the methods described here, only providing an initial description of sedimentary fill of the basin. Additionally or alternatively, some implementations may include further reference to the sediment-fill modeling software, such as when the sediment-fill volumes are updated based on collection of further geologic data or when measured parameters related to play elements do not correspond to the modeled play elements and the sediment fill volume is updated to improve the correspondence between the modeled play elements and the measured parameters.

The predictive models or filters applied to determine play-element properties may take a number of forms. These forms may include, but are not limited to: full-physics computational models; parametric models that approximate full-physics models; parametric models that apply empirical knowledge; and Bayesian-logic based models, such as Bayesian belief networks (BBNs), that apply expert knowledge, which forms may be used alone or in combination within a given play-element predictive model. In general, multiple techniques are employed in the definition of each play-element volume. As is well known, a plurality of play elements has been identified. The present systems and methods may be used to provide play-element volumes for any one or more of these play elements within any implementation. Non-limiting examples of suitable play-element volumes that may be represented in one or more play-element volumes are described below. Others may become apparent from the present description; the present systems and methods may be adapted to incorporate all suitable play elements.

Source Rock

The presence and quality of organic-rich rock is a very important play element in understanding the potential for hydrocarbon systems. Considerable literature exists documenting the conditions under which one should suspect the deposition of organic-rich lacustrine algal (Type I), marine algal (Type II), or paralic (Type III) organic-rich rocks and the expected quality of such rocks in terms of original total organic carbon (OTOC) and original hydrogen index (HIo). Exemplary articles describing these conditions include: 1) Bohacs et al., "Production, Destruction, Dilution, and Accommodation—the many paths to source-rock development," in Harris, N. (editor) *The deposition of organic carbon-rich sediments: Mechanisms, Models and Consequences*, SEPM Special Publication 82, p. 61-101 (2005); 2) Parrish, "Upwelling and petroleum source beds, with reference to Paleozoic," *American Association of Petroleum Geologists Bulletin* 66, 750-774 (1982); 3) Barron, "Numerical climate modeling, a frontier in petroleum source rock prediction: results based on Cretaceous simulations," *American Association of Petroleum Geologists Bulletin* 69, 448-459 (1985); 4) Kruis and Barron, "Climate model prediction of paleoproductivity and potential source-rock distribution," *American Association of Petroleum Studies in Geology* 30, 195-216 (1990); 5) Mann et al., "OF-Mod: an organic facies modeling tool," *Applications of numerical modeling in stratigraphy and basin analysis*, Mountney and Burgess, Editors, London, UK, page 31 (2000); 6) Knies and Mann, "Depositional environment and source rock potential of Miocene strata from the central Fram Strait: introduction of a new computing tool for simulating organic facies variations," *Marine and Petroleum Geology*, 19(7), 811-828 (2002); and 7) Mann and Zweigel, "Modeling source rock distribution and quality variations: The OF-Mod approach," *Analogue and Numerical Forward Modeling of Sedimentary Systems; from Understanding to Prediction*, de Boer et al. ed's., Special Publication number 39 of the International Association of Sedimentologists (2007). Those conditions may be encoded or otherwise incorporated into software algorithms to infer the distribution of probability and quality of organic-rich rocks throughout the sediment-fill volume.

As one example, SourceRER is a Bayesian Belief Network (BBN) that may be used to estimate the probability of encountering Type II organic-rich rock within sedimentary units deposited in a marine environment, as well as the expected OTOC and HIo of any such rocks encountered. SourceRER codifies a suite of recognized relationships linking depositional environment and organic richness. Additional information regarding SourceRER is disclosed in PCT Patent Application No. PCT/US2008/007185, filed on 9 Jun. 2008 by ExxonMobil Upstream Research Company, the entire disclosure of which is incorporated herein by reference for all purposes.

SourceRER is driven by the input of specific paleo-geographic, paleo-climatic, and paleo-depositional quantities. Output includes the probability of Type II organic-rich rock and expected probability distributions of OTOC and HIo. A time-series of the paleo-geographic and paleo-climatic input for any basin in question may be constructed from existing paleo-geographic and paleo-climatic atlases or may be computed from global-to-regional-scale modeling approaches. The required paleo-depositional information, specifically geologic time, sedimentation rate, water depth, and eustacy are properties that may be extracted from the sediment-fill volume of the basin for each cell or location within the volume.

Figure 7:
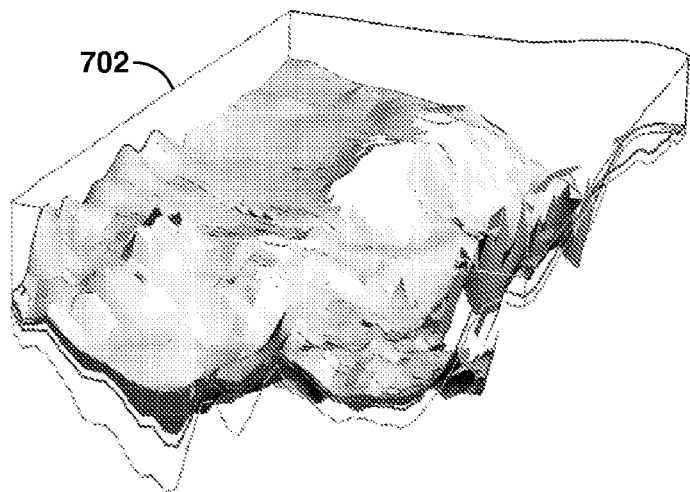
FIG. 7 provides an exemplary illustration of a play-element volume.

In operation in the present systems and methods, the SourceRER BBN may be embedded as a tool within the sediment-volume visualization system, acting on the properties of each location to create and populate new properties in each location of probability, OTOC and HIo of Type II organic-rich rock. A simple flat-file or spreadsheet of the time-history of the paleo-geographic/and paleo-climatic input may be referenced by the SoureRER BBN to obtain the relevant data. Using other sediment-fill volume location-specific properties, such as thickness or shale fraction, the present systems and methods may compute additional properties, such as TOC-meters. Accordingly, a source-rock play-element volume 702 may be visualized and filtered at any desired level of probability or quality, and attributed or colored by any desired property, such as illustrated in FIG. 7.

Models and systems incorporating Bayesian-logic, such as Bayesian Belief Networks, which may be similar in principal to SourceRER, may be utilized in a similar manner to create play-element volumes of lacustrine, paralic, and pro-delta (mixed Type II-Type III) organic-rich rocks. While SourceRER and Bayesian-logic models are provided as examples, it is not necessary to employ SourceRER or even a Bayesian Belief Network to provide a source-rock play-element volume. Any other predictive model of similar capability could be used. Similarly, it is not necessary to embed the model within the present sediment-volume visualization system. Instead, sediment fill properties could be exported to an external modeling process to develop the source-rock related properties, which may be visualized separately. As described above, the present methods may be accomplished through systems incorporating multiple processors, displays, etc. in communication with each other. Accordingly, SourceRER and other similar systems may be embedded or incorporated into any number of computer systems or components in communication with each other for continued processing and/or visualization.

Temperature/Pressure

Temperature and pressure are not themselves play elements, but play a strong role in predicting or estimating play elements such as hydrocarbon yields, hydrocarbon migration, and reservoir quality. Accordingly, temperature and pressure will be discussed briefly here.

The present systems and methods may incorporate temperature and pressure in any of several manners. At present, the most complete and detailed means of incorporating temperature and pressure information in the systems and methods herein is through what is generally known as basin modeling—the numerical modeling of the temperature and pressure histories of the rocks within a sedimentary basin and their impact on rock properties. The sediment-fill volume(s) contain most of the information required as input to any of a number of commercial or proprietary basin modeling applications used in the hydrocarbon exploration industry to compute the distribution and history of temperature and pressure throughout a sedimentary basin. Readily available and/or readily developed software tools may act on the sediment-fill volume(s) to prepare input files for the basin modeling tool of choice (or may be configured to launch the tool directly to act on a prepared data structure). In some implementations, the software tools and/or the basin modeling tools may allow for the introduction of additional input. Results of the basin model (e.g., temperature, pressure) may be calibrated to available data using conventional basin-modeling workflows. Final temperature and pressure results may be imported as properties into the locations or cells of the sediment-fill volume, such as into the present-day volume, and, in some cases, into volumes representing the basin at past times. If the basin model is constructed and executed at a different spatial and/or temporal resolution than the sediment-fill volume, this importation may involve interpolation to determine the correct property-values for each location or cell of the sediment-fill volume. While reference is made to importing from a basin model to a sediment-fill volume, it should be understood that import is used broadly to refer to the act of applying properties to locations of the sediment-fill volume rather than importing from a first format to a second format or importing according to a particular protocol, though such techniques may be used in applying the temperature and pressure properties to the sediment-fill volume.

In many circumstances, one may avoid the time and effort of a full basin model by interpolating temperature and pressure from actual or generalized depth-profiles representing one or more locations or regions in the basin. In basins of more advanced exploration maturity, sufficient observations of temperature and/or pressure may exist to have developed a detailed synthesis, such as contour maps of temperature or pressure on selected stratigraphic surfaces, or depth maps of selected isothermal or isobaric surfaces. Digital versions of such maps or similar datasets may be imported and interpolation techniques employed to determine appropriate property-values for each sediment-fill location or cell.

Organic Maturity/Hydrocarbon Yields

In conjunction with the source-rock play-element volume, the thermal history of the sedimentary basin contributes to another play element: hydrocarbon yields. The hydrocarbon yield play element addresses where and when within the basin were significant quantities of hydrocarbons generated and released from source rocks, what were those quantities, and of what types of hydrocarbons were they comprised. In some implementations of the present systems and methods, properties and/or data related to source-rock distribution and character may be exported to the basin modeling tool described above, and the basin modeling workflow described above computes hydrocarbon yield histories and/or present-day cumulative yields, which may be imported back into the sediment-fill volume. However, export of the source-rock play element data to an external basin modeling tool may not be required as such tools may be incorporated into and/or in communication with the systems of the present disclosure.

In some implementations, it may be sufficient to approximate hydrocarbon yield quantities by means of an established approximate relationship of oil and gas yield to source type, richness (OTOC and HIo), and temperature history or an index of organic maturity (e.g., vitrinite reflectance), which is itself related to temperature history. A property representing an index of organic maturity may be created for each location in the sediment-fill volume, such as representatively illustrated by organic maturity play-element volume 802 in FIG. 8. The organic maturity index may be created in one of several methods analogous to the methods described above for creating a temperature property. For example, the organic maturity index may be computed in a basin modeling application and imported and interpolated within the sediment-fill volume, or may be imported and interpolated from a basin modeling application, or may be imported in any of several manners from syntheses of observations or estimates of data within the basin. From the temperature history or organic-maturity index property, cumulative yield properties for locations within a sediment-fill volume may be calculated or derived utilizing computerized algorithms and/or by simple look-up/interpolation tables.

Figure 8:
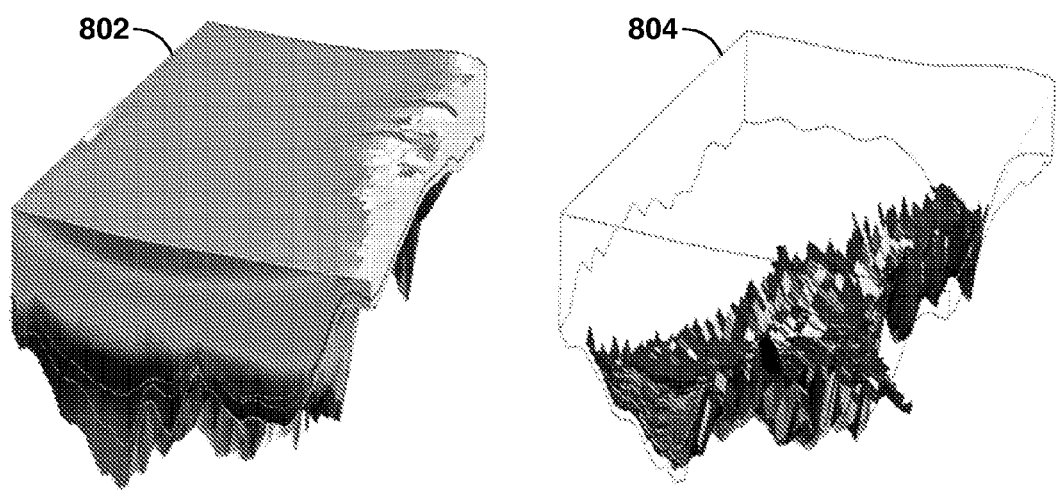
FIG. 8 provides an exemplary illustration of a play-element volume.

Thus, the combination of source-rock play-element volume (and associated properties) and thermal histories and/or organic maturity index properties can be utilized to produce oil and gas hydrocarbon yield play-element volumes 804 attributed with probability and quality (yield magnitude) properties, such as representatively illustrated in FIG. 8. Note that where the geologic history requires it, yield play-element volumes may be created for any past times in the basin history, or representing cumulative yields over any time interval in the basin history.

Hydrocarbon Migration

As is well understood, hydrocarbon migration informs and affects the hydrocarbon charge within the basin. Accordingly, hydrocarbon migration and migration probabilities may be defined as play-element volumes utilizing the systems and methods of the present disclosure. Given the distributions of oil and gas yields within the volume, given the distributions of sediment properties within the volume, and given the geometry of the volume, one may establish the probabilities of oil or gas reaching or passing through each location of the basin represented by the sediment-fill volume. There are at least three general approaches to accomplishing this, including: invasion percolation, geometric analysis, and Darcy flow. The present systems and methods may include any or all of these approaches, though the Darcy flow approach is presently considered to be demanding in computing resources and its assumptions are considered less well suited to geologic time-scales and very large model cells.

The invasion percolation method of analyzing hydrocarbon migration works by quantifying the competing forces of hydrocarbon buoyancy and the capillary entry pressure that must be overcome to advance a hydrocarbon migration front. The most commonly used software implementing the invasion percolation modeling of hydrocarbon migration is the MPath application developed by and available from Permedia Research. Accordingly, in some implementations, the present systems and methods may pass data to MPath, such as via file export. Exemplary data that may be passed to the MPath application includes the 3D cellular model of the geologic basin and/or the sediment-fill volume with a number of properties defined for each cell or location within the basin. For example, properties such as temperature, pressure, porosity, hydrocarbon yields, residual water and hydrocarbon saturations, and mercury injection capillary pressure (MICP) may be defined for a plurality of locations within the basin.

All these properties may be obtained and/or calculated from information in the sediment-fill volume. For example, the temperature, pressure, and hydrocarbon yield properties may be obtained as discussed above. The burial history of each cell obtainable from the sediment-fill forward model allows the calculation of the porosity and permeability of each constituent lithotype (sand, shale, etc.) within each cell by application of a preferred porosity-vs.-depth relationship. Permeability of each lithotype within each cell may then be computed using an appropriate Kozeny-Carman function, see, for example, Carman, P. (1937) Fluid flow through a granular bed, Trans. Inst. Chem. Eng., 15, 150-167; and Costa, A. (2006) Permeability-porosity relationship: a reexamination of the Kozeny-Carman equation based on a fractal pore-space geometry assumption, Geophysical Research Letters, 33. Effective bulk porosity may be calculated for the cell using an arithmetic mean of porosities of constituent lithotypes, weighted by their fractions within the cell volume. Effective bulk permeability may be calculated for each cell using a (generally) geometric mean of permeabilities of constituent lithotypes, weighted by their fractions within the cell volume. An effective MICP may be computed for each cell using the effective bulk porosity and permeability via the Katz-Thompson relationship, see, for example, Katz, A. J. and A. H. Thompson (1986) Quantitative prediction of permeability in porous rock, Physical Review B., 34(11), 8179-8181. Residual water and hydrocarbon saturations may be estimated from effective permeabilities.

Figure 9:
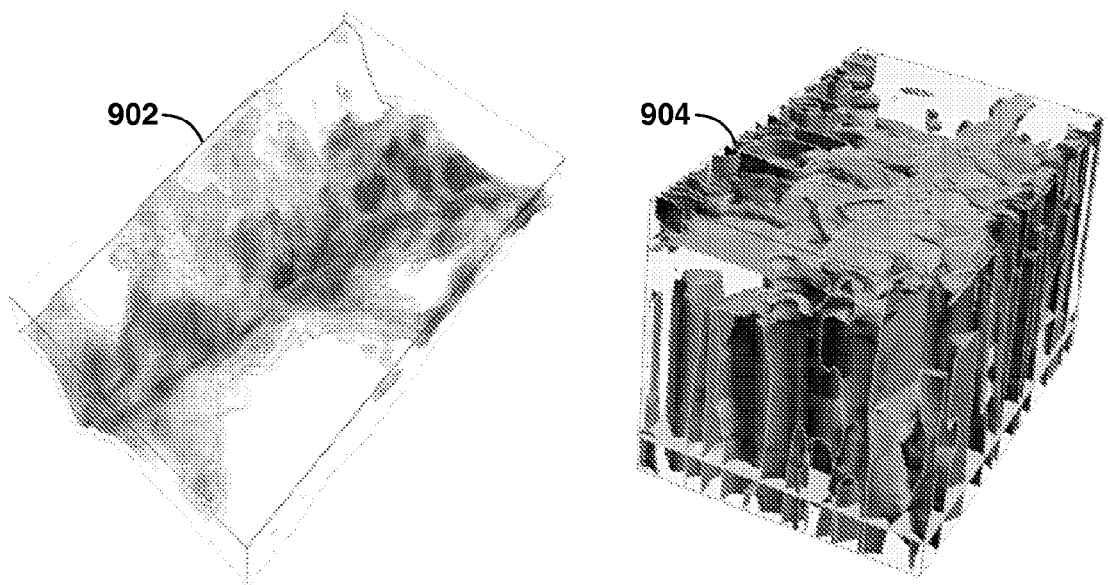
FIG. 9 provides an exemplary illustration of a play-element volume.

While the properties relevant to the determination of migration play elements and the utilization of the MPath application may be developed as described above, a basin modeling application may be used to compute temperature and pressure in the sediment-fill volume together with these properties (porosity, permeability, MICP, residual saturations) related to the migration play element, which may all be imported or otherwise applied to the locations or cells of the sediment-fill volume. Regardless of how the migration-related parameters are calculated, the present systems and methods, when utilizing the MPath application or similar applications, create a file for input to MPath, which is used to simulate hydrocarbon migration in its stochastic mode. Results from the MPath application (or similar applications) include the probabilities of oil or gas being found in each cell, which may be imported into the present systems and methods and stored as properties in a migration probability play-element volume 902 as seen in FIG. 9. Note that the migration analysis, though generally carried out for the present-day state of the basin, may be carried out for any past configuration, and should be in circumstances in which the bulk of hydrocarbon generation occurred at some time in the past. Indeed, MPath can be employed in its dynamic mode, in which a time-sequence of basin states is employed to model a time sequence of migration.

While the use of the MPath application and/or MPath-type applications may be suitable for establishing migration probability play-element volumes, the present systems and methods may additionally or alternatively employ a 3D analog to 2D map-based flow-line migration methods that analyze migration within and between drainage areas to analyze potential hydrocarbon migration. Drainage areas may be constructed on each of the structural/stratigraphic layers of the sediment-fill volume. The drainage areas may be related across layers to form 3-dimensional drainage volumes, such as the drainage volumes 904 depicted in Wheeler space within the sediment-fill volume, such as illustrated in FIG. 9. The probability of hydrocarbon migration within the sediment-fill volume may be determined by starting from a layer containing cells with hydrocarbon yield within a particular drainage volume. Considering the seal properties of the overlying layer, the likelihood of hydrocarbons leaking into the overlying layer (i.e., remaining within the drainage volume) may be estimated as well as the likelihood of the hydrocarbons spilling across a drainage divide at the same layer (i.e., spilling into an adjacent drainage volume). In this manner, the probability of hydrocarbons reaching any part of the sediment-fill volume can be estimated. The likelihood of hydrocarbons leaking and/or spilling may be determined through application of any suitable modeling routines (e.g., full-physics computational models, parametric models, Bayesian-logic models, etc.). In some implementations, a Bayesian Belief Network may be developed to account for the various probabilities introduced in determining or estimating the hydrocarbon migration. Additionally or alternatively, the present methods can incorporate modifications to migration probabilities introduced by faults and/or fractures.

Reservoir Presence

The distribution of sand (sand-sized fraction or net sand properties) throughout the sediment volume is a good proxy for the presence of silici-clastic reservoir potential, but can be improved through the implementation of Bayesian Belief Networks to more fully utilize the information in the sediment-fill model and/or in other play-element volumes.

Figure 10:
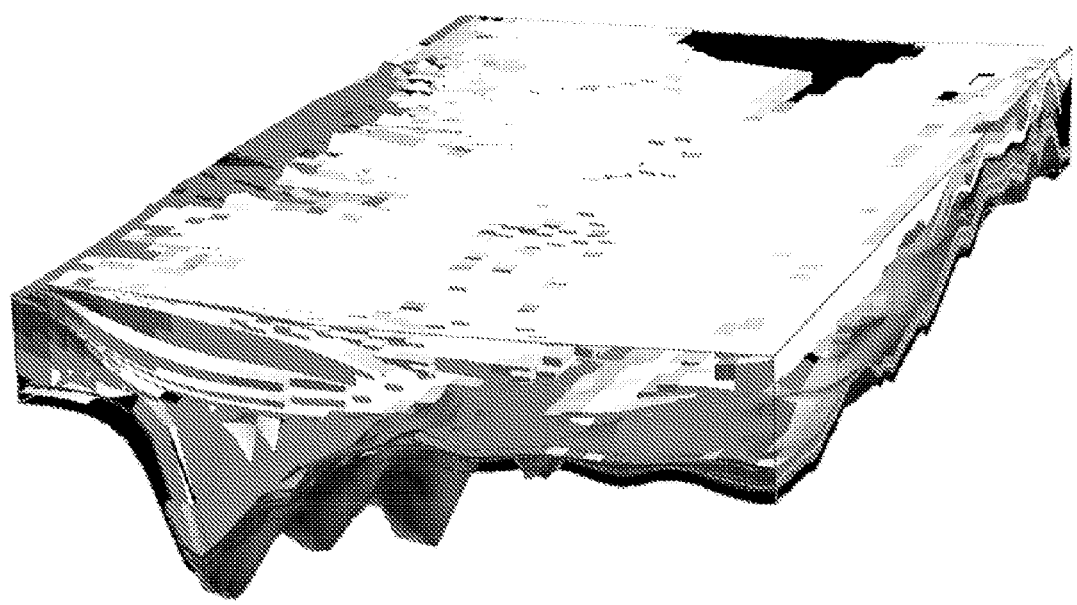
FIG. 10 provides an exemplary illustration of a play-element volume.

For example, a diffusion-based sediment-transport model like Dionisos, in modeling the transport of clastic sediment across a continental slope, will not typically produce in its model results explicit confined channel complexes. The diffusive sediment transport model is more broad-scale in its treatment. Yet confined channel complexes form an important clastic reservoir exploration target. A suitable Bayesian Belief Network may be applied to incorporate expert knowledge to infer the probability that a given cell contains confine-channel-complex facies based on properties of paleo-depositional conditions (e.g., water depth, slope, net-to-gross, flux, etc.) and to store that inference and the inferred reservoir-body volume and net-to-gross as properties of the cell. Similarly, Bayesian Belief Networks may be implemented for the estimation of other important fluvial and marine clastic reservoir facies (e.g., fluvial channels, near-shore facies, reworked shelfal sands, deepwater fans, etc.). FIG. 10 illustrates a representative reservoir presence play-element volume 1002 with locations attributed with properties related to the probabilities of reservoirs of different facies.

Similar techniques may be employed to identify potential carbonate reservoirs and to quantify the probability and expected character of carbonate reservoir in specific cells or locations of the sediment-fill volume. These include, for example, different facies of reefs and carbonate platforms. Such reservoirs may similarly be represented in the reservoir presence play-element volume 1002 of FIG. 10 and/or separate reservoir presence play-element volumes may be provided for the different types of reservoirs.

More subtle reservoir possibilities also may be identified by the same approach. For example, slumping of chalk on the sea floor can lead to enhanced reservoir quality on burial. Based on paleo-depositional slope, the present systems and methods can recognize portions of chalk facies that are more or less prone to contain slump features. Clastic mass flow features at scales too small to be modeled with the typical cell sizes of basin-scale sediment-fill models can still be attractive reservoir targets. However, those parts of the sediment volume more likely to contain such bodies can be recognized by the present system and methods based on paleo-slope, potential fault zones, and the lithology of potential provenance areas. Bending of brittle rocks can create fractured reservoir opportunities, and that potential can be recognized through consideration of lithology and the local curvature of sedimentary layers.

Accordingly, reservoir presence play-element volumes may consider and/or account for a multitude of reservoir types and/or conditions that contribute to the likelihood of reservoir formation. It can be appreciated from this example that a single play-element volume may be attributed with properties related to multiple play elements. Similarly, it can be appreciated that a single play element may utilize multiple play-element volumes for adequate or appropriate consideration by the present systems and methods.

Reservoir Quality

Reservoir quality, as impacted by diagenesis for example, may be estimated from temperature, pressure, maturity, and reservoir facies. Approximate rules may be implemented via computerized algorithms, such as via Bayesian Belief Networks to estimate the risk of reservoir quality at any given location, or in any given cell, falling below minimum levels. Additionally or alternatively, reservoir quality can be modeled within the context of a basin modeling application and results imported to the sediment-fill volume to form a reservoir quality play-element volume.

Silici-clastic reservoir quality is strongly influenced by the provenance and transport of the reservoir sand material. In some implementations estimating silici-clastic reservoir quality, Bayesian Belief Networks may be developed and/or applied that incorporate knowledge and inferences, such as from empirical models, full-physics based models, etc., of provenance and transport leading to a probabilistic quantification of reservoir quality, which may be incorporated into a reservoir quality play-element volume. For example, Exxon-Mobil's SandGEM technology may be used.

Seal

Figure 11:
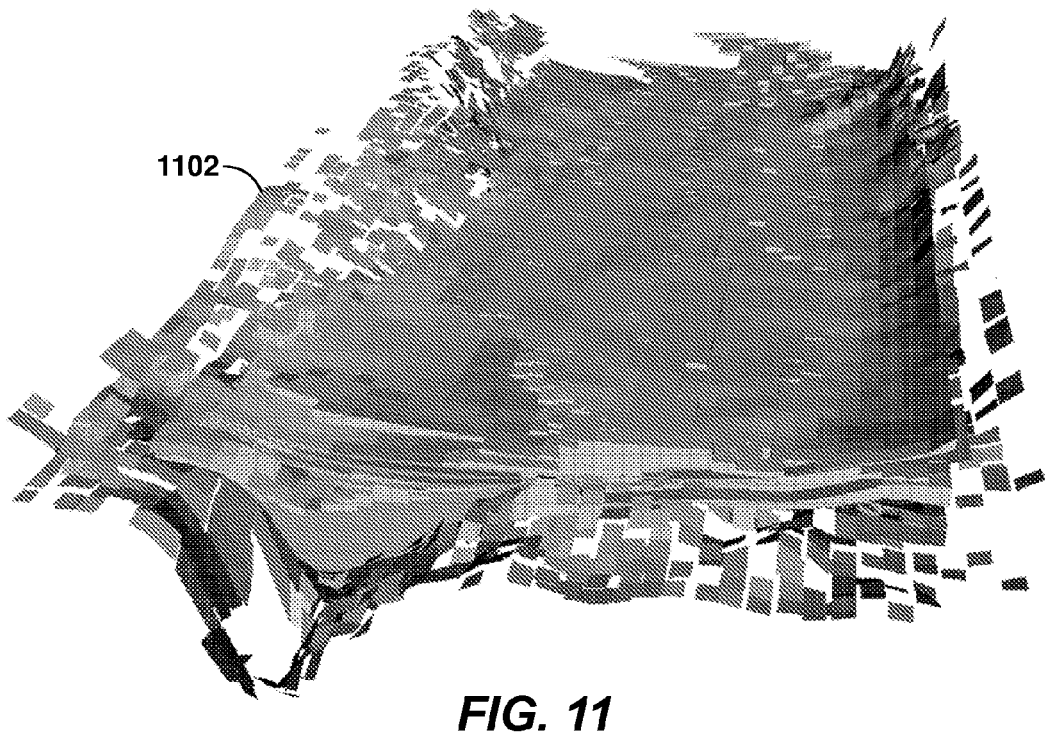
FIG. 11 provides an exemplary illustration of a play-element volume.
Figure 12:
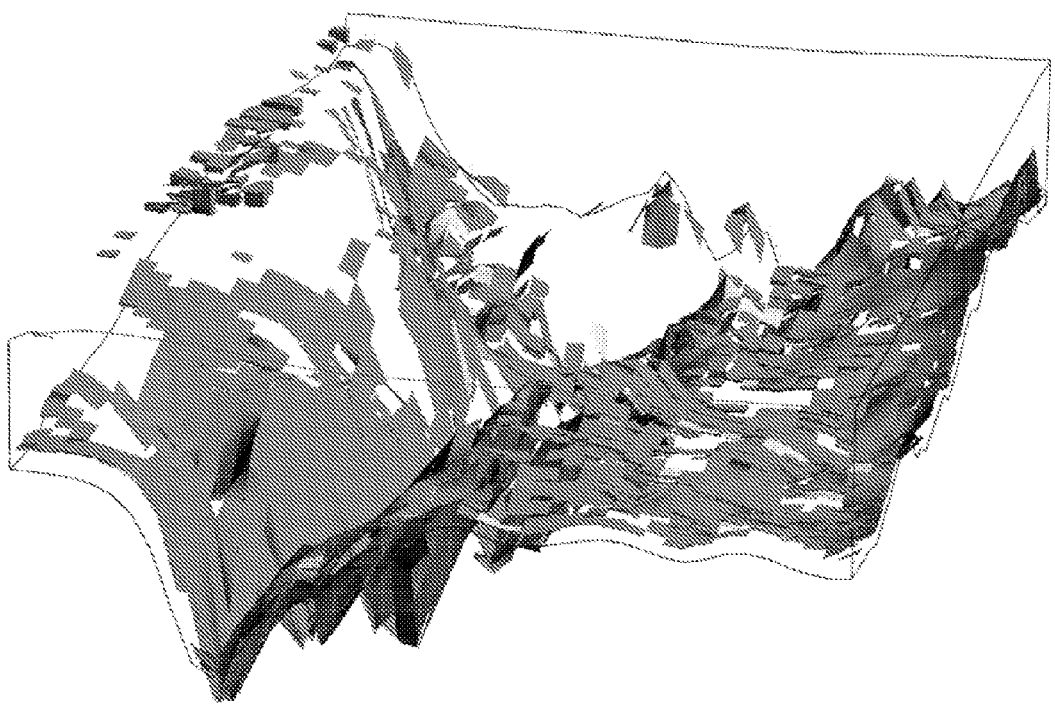
FIG. 12 provides an exemplary illustration of a play-element volume.

One method to identify and characterize potential hydrocarbon seals is through the calculation of the effective MICP for each cell as described in the discussion of migration, above. MICP can be used to rank or classify seal potential, for example through using the Sneider classification of seal, to provide a hydrocarbon seal play-element volume 1102 as illustrated in FIG. 11. Exemplary descriptions of Sneider classification of seals may be found in Sneider, R. M., Sneider, J. S., Bolger, G. W. and Neasham, J. W, 1997, Comparison of seal capacity determinations: conventional cores vs. cuttings, in R. C. Surdam, ed., Seals, traps, and the petroleum system: AAPG Memoir 67, p. 1-12.

Additionally or alternatively, the present systems and methods may identify hydrocarbon seal potential at a sub-cell scale. Cells identified as having reservoir potential (see the discussion of reservoir presence, above) may or may not also contain sealing facies that have potential to serve as an adequate "intra-formational" seal associated with that reservoir. A Bayesian Belief Network may implements expert knowledge to estimate the probability of adequate "intra-formational" seal for those cells identified as potentially containing adequate reservoir, based on reservoir type, net-to-gross, cell thickness, and sequence-stacking setting. Suitable logic and routines for the Bayesian Belief Network may be developed from the various models used by geoscientists, such as full-physics models, empirical models, and Bayesian-logic based models.

Trap

As described above, the present systems and methods are directed to play-scale opportunities and not on prospect-scale features. The sediment-fill modeling tools employed employ and the basin-scale interpretive data used for calibration (structure and EOD maps) usually do not have prospect-scale resolution. While some implementations may not be adapted to identify specific prospective traps, the present systems and methods can be used to identify trap regimes, which may be understood to be regions of the basin in which specific structural and/or stratigraphic trapping styles may be more or less likely. This is accomplished with sets of simple rules, which may be embodied or implemented in Bayesian Belief Networks, acting on facies, structural, and other properties of the sediment-fill volume cells and/or locations within the sediment fill volume.

For example, structural/stratigraphic traps may be formed involving reservoir deposited in fluvial-channel or confined-channel complex depositional environments. Trapping potential increases when the present-day azimuth of the structural dip of the channel approaches a 90-degree angle with respect to the azimuth of the depositional dip. In that situation, every other bend of the channel has an enhanced opportunity to form a combination structural/stratigraphic trap. Cells approaching those criteria can easily be recognized and flagged to form trap play-element volumes, such representatively illustrated at 1202 in FIG. 12. Similarly, cells in which other common trap styles have enhanced probability may be identified and flagged (e.g., various fault-related trap styles, sub-crop traps, pinch-out traps, etc.).

Play-Concept Volumes

A petroleum system or hydrocarbon system is generally defined as a hydrocarbon source rock, the hydrocarbons which arise from it, and the rocks through which they have passed or which have confined their movement. A hydrocarbon play is an assemblage of hydrocarbon accumulations which broadly share a common suite of play elements of source, reservoir, seal, and trap style. Hydrocarbon plays result from favorable spatial and temporal relationships among play elements. The present systems and methods assist geoscientists in predicting, visualizing, and understanding potential distributions of play-element volumes to better enable identification of hydrocarbon plays. For example, implementations of the present systems and methods define at least one play-concept volume by analyzing one or more play-element volumes. The play-concept volume represents a plurality of locations within the basin and is adapted to communication to geoscientists: 1) identifications of each play element associated with the location, 2) the qualities of each play-element volume associated with the location, 3) the probability for each play element that the play element satisfies a determined criteria, and 4) a composite likelihood that the location represents a hydrocarbon play.

Some implementations include the geoscientists visualizing the one or more multiple play-element volumes, attributed with measures of quality and probability distributed throughout the basin or sediment-fill volume, and co-rendered with known hydrocarbon occurrences within the basin. These may be rendered in geographic space (using x, y, and z as the three axes) or in Wheeler space (using x, y, and geologic time as the three axes). Using their collective exploration insight, the geoscientists recognize, describe, and delineate potential hydrocarbon play opportunities and present the play opportunities as play-concept volumes covering plurality of locations within the basin. The play-concept volumes may be attributed with the parameters or properties considered by the geoscientists (e.g., the play-element volumes, their qualities and probabilities of adequacy, etc.) and with a parameter or feature indicative of the composite likelihood that the locations represent a hydrocarbon play (i.e., the assessment provided by the geoscientists). The play-concept volumes may be prepared with greater or lesser degrees of involvement by the geoscientists in the interpretation of the play-element volumes.

While application of the collective insight of the geoscientists may be a suitable method of identifying play opportunities within the sediment-fill volume, the present systems and methods may also incorporate automated recognition and characterization of play-concept volumes.

The play-concept volumes may be identified according to following algorithm, which utilizes the results, parameters, and properties created in the identification of play-element volumes as described above: 1) identify locations within the sediment-fill volume that have a likelihood of adequate reservoir (i.e., reservoir presence and reservoir quality); 2) identify which of those locations are in a favorable position with respect to likely seal features (i.e., beneath, down-dip of, or inter-bedded with); 3) identify which of those locations have access to hydrocarbons (which cells can be reached by hydrocarbon migration, and at what level of likelihood, and from what source units); and 4) identify which trap regimes may coincide with which of these cells and at what levels of likelihood. Cells, or other locations within the volume, that pass through this algorithm or series of filters may be identified as "opportunity cells" and are attributed with identification of the play-element volumes contributing to the opportunity, the likelihoods of each, and the composite likelihood of the "opportunity." The opportunity cells may be presented as play-concept volumes for visualization by geoscientists in three or four dimensions.

Figure 13:
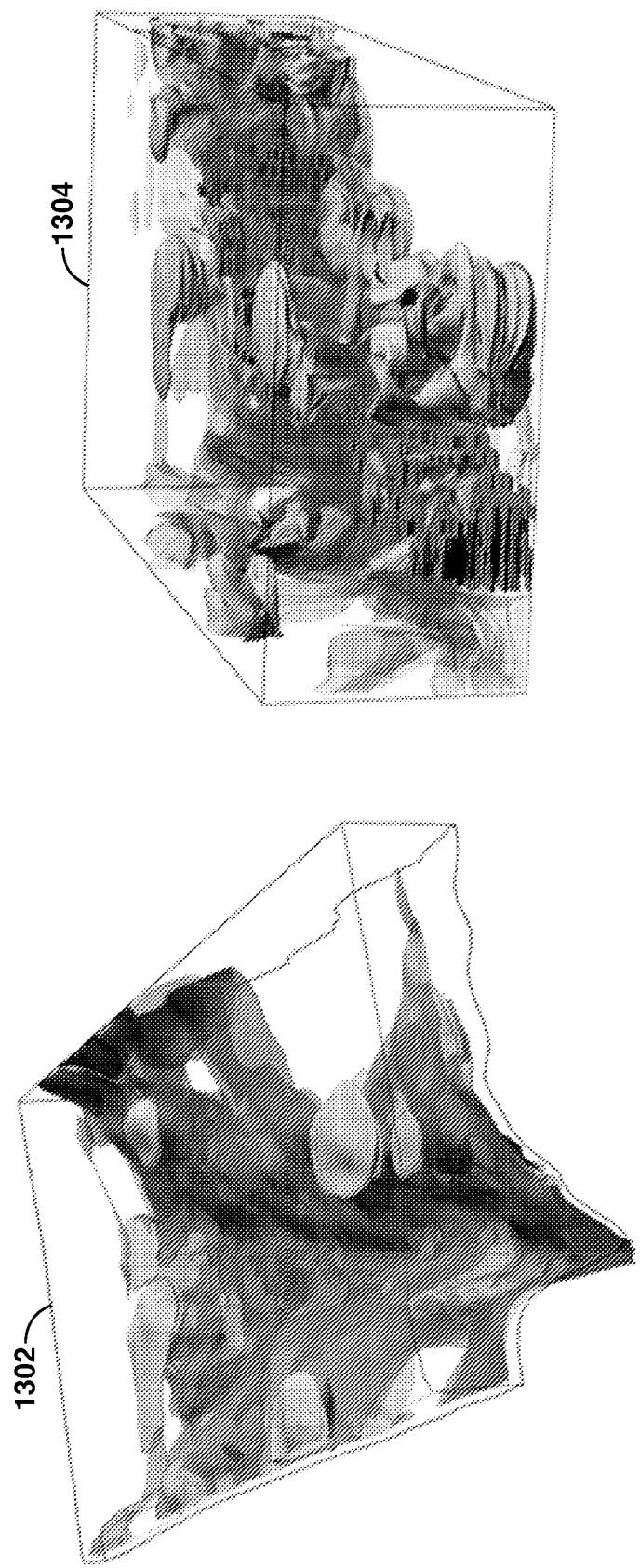
FIG. 13 provides an exemplary illustration of a play-concept volume.

Hydrocarbon plays, or groups of play-concept cells similar in play element properties, may be identified and characterized by principal-component analysis or other analytic methods. Similarly, internally similar sub-sets of the cells of each play element may be identified. These groups of internally similar play-element cells and/or play-concept cells may be referred to as geobodies, such as play-concept geobodies and/or play-element geobodies. The geobodies may be created by sculpting one or more surfaces about the volume of each identified similar subset of cells. In the context of play-concept geobody, each play-concept geobody may represent a hydrocarbon play within the basin. Play-concept geobodies may be co-rendered with related play-element geobodies, such as illustrated in FIG. 13. FIG. 13 presents a visualization of a play-concept volume having play-element geobodies and play-concept geobodies overlaid thereupon, which is illustrated in Cartesian or geographic space at 1302 and in Wheeler space at 1304. Rendered color and/or transparency of play-concept geobodies and/or play-element geobodies may be used to represent the level of composite likelihood that the geobody represents a hydrocarbon play and/or satisfies determined criteria.

Geoscientists making use of the present systems and methods may be provided with the play-element volumes in addition to the automatically identified play-concept volumes to aid in identifying hydrocarbon plays. While the automatically identified play-concept volumes and/or play-concept geobodies apply logic and filters consistent with the interpretive techniques applied by geoscientists, some geoscientists may prefer to refer to the play-element volumes to verify, either through brief inspection or through thorough analysis, that the automatically identified play-concept volumes are consistent with the geoscientists' theories and interpretative styles. Accordingly, through a combination of examining automatically identified play-concept volumes and examining the distributions of play elements, the geoscientists may be able to form a deep and comprehensive understanding of potential play opportunities within the basin.

Figure 14:
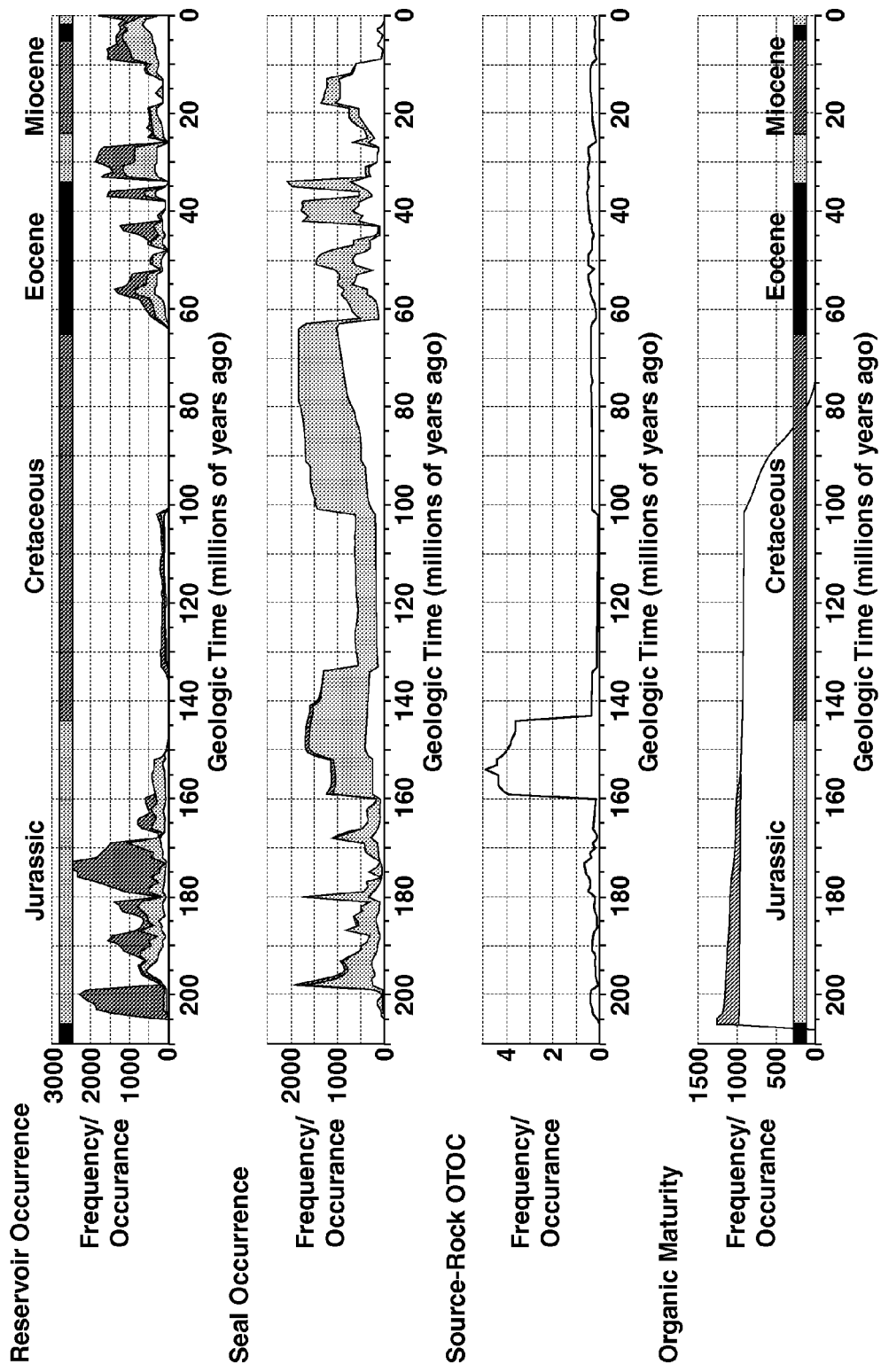
FIG. 14 provides examples of play summary charts available from the present systems and methods.

In addition to the play-concept volume renderings of play-element bodies and other attributes or properties of the basin fill, the present systems and methods may assist the exploration team in identifying play opportunities through other graphic tools that may be exported and/or presented for visualization by the geoscientists. Exemplary graphic tools may include cross-plots of any chosen pair of properties (and optionally colored by a third property) within any sub-volume. Additionally or alternatively, exemplary graphic tools may include plots of geologic-age histories of values or frequencies (such as, relative probabilities) of any chosen properties, which may be weighted by number of cells or by volume of sediment-fill, and which may include statistical aspects such as mean, mode, maximum, etc., within any sub-volume. This capability facilitates the display of a traditional play-summary chart of the basin or of any portion of the basin (e.g., a given hydrocarbon system), such as shown in FIG. 14. Still additionally or alternatively, map projections of values or frequencies (relative probabilities) of any chosen properties may be presented for visualization, which may be weighted by number of cells or by volume of sediment-fill, including statistical aspects such as mean, mode, maximum, etc., within any sub-volume (e.g., a source unit or a hydrocarbon system).

The systems and methods of the present disclosure are intended to help ensure that all significant potential plays are recognized, considered, and receive appropriate attention by the geoscientists and exploration team. In addition to laying out the potential play concepts by way of play-concept volumes and play-concept geobodies, the present systems and methods provide information helpful for devising work plans to most efficiently test and refine the play-concepts of greatest potential value. As can be seen from the forgoing discussion, the present systems and methods provide direct, objective connections and relationships between identified play concepts and aspects of the geologic interpretation(s) of the basin. For example, the play-concept volume(s) are attributed with information related to the relevant play elements' qualities and likelihoods of satisfying determined criteria. Accordingly, the geoscientists are able to identify which play elements are in doubt and/or which play elements, if confirmed, would confirm the existence of a hydrocarbon play. The exploration team may use those relationships to help identify data that would best be acquired and/or interpretive analyses that would best be undertaken to most efficiently confirm or refute the reality of each potential play.

Over time and with use, the present system and methods can have increasing utility in exploration activities through the application of analogs, including: 1) proven hydrocarbon play and field analogs, and 2) the present disclosure's model-based analogs. Play and field analogs provide valuable calibration for the present models for play-concept and play-element recognition. By understanding the fundamental controls and processes that resulted in a "subtle" accumulation in a prior basin or portion of a basin, the concept-recognition criteria discussed above may be improved, such as in one of the manners discussed above in connection with FIGS. 3-5.

The analytical methods by which the present systems and methods identify distinct plays, such as cluster analysis, principle-component analysis, pattern-recognition analysis, etc., provide an objective set of metrics by which the degrees of similarity of different play concepts may be judged. This may be carried out not only for plays within one basin or implementation of the present methods, but across all basins and plays that have been analyzed through the present methods or with the assistance of the present systems. As the present systems and methods are employed in exploration projects over time, the experience set is developed against which any new analysis can be compared and validated. It then becomes possible to view all previous examples that are similar to the current instance (the play concept or play element in question) above any chosen level of similarity, and to understand in what ways they are most similar or least similar. Consideration of which of these are proved, disproved, or still unknown contributes to a determination of risk for the current instance. The set of play-elements/play-concepts/probabilities/metrics evolves into a rich resource itself to be mined for experience and new ideas. Accordingly, the collection of past and ongoing implementations may be searched for indications of analogs to plays previously identified or proven in other basins. Principal component analysis or pattern-recognition techniques may be employed to search the property-space of the basin for patterns matching or approximating those of identified or proven plays or play-elements. The distribution and properties of the newly identified play concept or play element are identified, as well as those of the analog patterns to which they are a good match and a quantification of the degree and character of the similarity. By comparing the new play-concept volumes and/or play-element volumes against past, proven or disproven play-concept volumes, the risks associated with the current implementations can be better appreciated.

As can be understood from the foregoing, the data and interpretations used to calibrate or condition the basin-fill model are generally uncertain and non-unique. In addition, the models used to fill the basin and identify potential play elements have inherent uncertainty related to the modeling assumptions and simplifications. Various methods of dealing with uncertainty were described above in connection with FIGS. 3-5 and will be discussed further here. Uncertainty is introduced at various points in the present systems and methods due to the necessity of using estimated data inputs. These uncertainties may be addressed by the present systems and methods by capturing the uncertainty and/or probability in the play-element volume and/or play-concept volume explicitly to thereby raise the uncertainty to the attention of the geoscientists. Additionally or alternatively, uncertainty may be reduced through various means discussed herein such as calibration, iterative analysis, and use of Bayesian logic.

While uncertainty may be introduced at various stages, errors or uncertainties in the sediment-fill volume will affect the accuracy of the remainder of the present systems. For example, the uncertainty of modeling the sediment-fill volume may impact the distributions of play elements and plays. The uncertainty of the sediment-fill volume may itself be broken down into two principal aspects: 1) multiple and different fundamental geologic interpretations of the geologic evolution of the basin (geologic scenarios), and 2) within a given scenario, possible variations of the parameters of the sediment fill model that would each lead to sediment-fill volume results different from one another yet all consistent with constraining data within the basin.

Through probabilistic runs and analyses of alternate sediment-fill realizations of the basin (multiple Monte Carlo realizations and/or an experimental design approach), the present systems and methods may produce multiple realizations of the play-element and play-concept bodies in the basin, such as introduced above in connection with FIG. 5. The robustness of a given play concept across the full range of outcomes may be a measure of its chance of validity. Moreover, the full range of results will reveal the ranges or combinations of geologic interpretations which lead to a play concept appearing or vanishing, information which will have an impact on focusing further exploration activities.

In addition to identifying play concepts from the set of play-element volumes, the present systems and methods may be used to explore the "missing-element" scenarios in which one or more play elements are predicted to be inadequate. These situations are investigated through sensitivity studies to determine what changes in assumptions or interpretations that impact the sediment-fill model are required to lead to a viable play concept. This allows the exploration team to distinguish quantitatively between subtle potential opportunities and play concepts that are prohibitively improbable. Moreover, these scenarios allow the exploration team to identify field data that may be used to support or refute propose play-concepts.

Exemplary Workflows

As described above, the identification of exploration opportunities requires geoscientists to make predictions of favorable conditions in the subsurface for the accumulation of hydrocarbons. In many cases the availability of subsurface data (i.e., seismic, gravity, magnetics, well logs, rock samples, etc.) is insufficient to constrain the predictions with high confidence. In these situations, geoscientists will typically apply their understanding of the geologic processes that control the distribution and character of hydrocarbon system elements to obtain reasonable estimated data inputs. Because of the high uncertainty inherent in these predictions, the geoscientists generally estimate a range of possible outcomes and consider multiple-working hypotheses that lead to alternative scenarios. As described above, the present systems and methods may be implemented to facilitate such iterative approaches. Additionally, it is presently believed that the conditions of the subsurface are best understood when approached within an integrated hydrocarbon systems workflow that ranges from global-scale to pore-scale. This approach is based on the hypothesis that, by understanding the geologic system from a first-principles perspective, geoscientists can make more reliable predictions about the character of the structure, sediments, and hydrocarbon distribution in a basin, play, and/or prospect.

Figure 15:
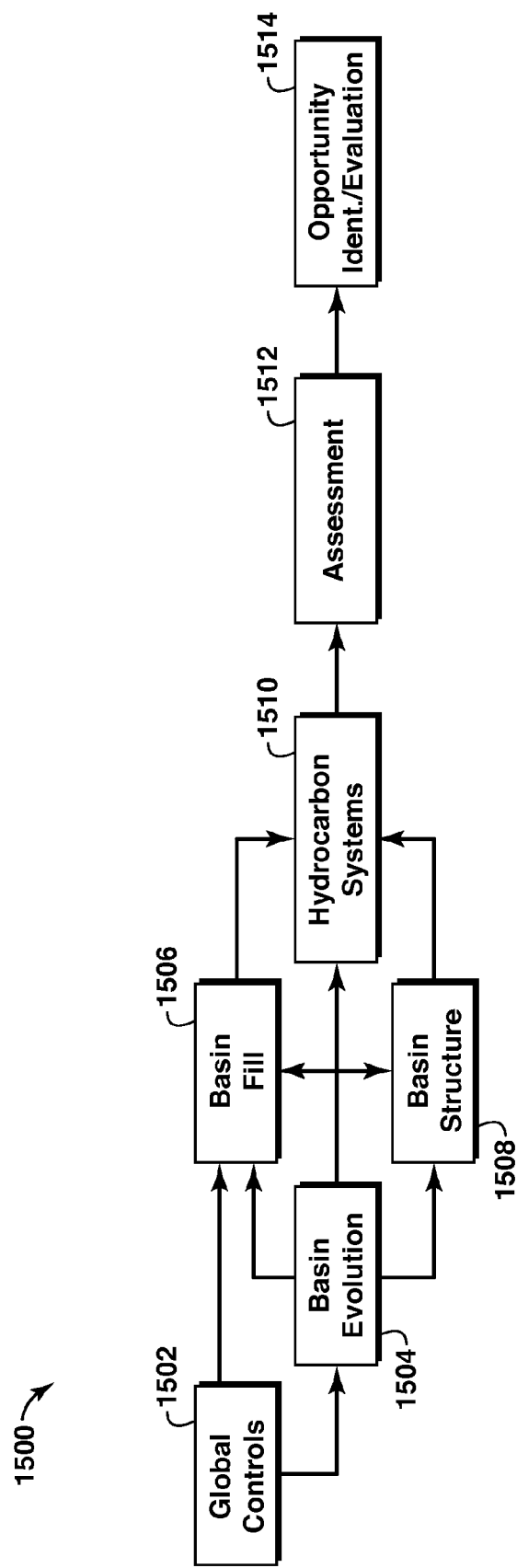
FIG. 15 provides an exemplary flow chart of an integrated hydrocarbon systems workflow.

An exemplary integrated workflow is illustrated schematically in FIG. 15. Each step in this workflow, which may be a workflow unto itself, is designed to provide an improved framework within which the subsequent workflow steps can be accomplished. While the flow charts illustrate exemplary workflows and may be discussed or presented in a substantially linear direction, such a linear progression is not required in all implementations or workflows. In some implementations of the present workflows, there may be many feedback loops in the workflow that allow for iteration to continuously improve the geoscience interpretation, which may be interpreted by geoscientists, computers, or a combination of the two. Also, in some implementations, one or more of the steps described herein may be omitted or otherwise have less importance than other steps. The workflows and steps implemented may depend on the problem being addressed and/or the condition of the basin being modeled.

At a high level, the integrated workflow may be organized into seven workflow groups, each of which will be described in turn. By way of introduction, the integrated workflow 1500 of FIG. 15 may include: 1) a global controls workflow 1502; 2) a basin evolution workflow 1504; 3) a basin fill workflow 1506; 4) a basin structure workflow 1508; 5) a hydrocarbon systems workflow 1510; 6) an assessment workflow 1512; and 7) an opportunity identification and evaluation workflow 1514. Each workflow group is described in more detail below. However, each will be introduced here.

One of the objectives of global controls workflow group 1502, is to provide a regional framework and genetic context for the prediction of how the basin evolves through geologic time. The basin evolution workflow group 1504 involves the prediction of the temporal and spatial distribution of subsidence and uplift in the basin and adjacent hinterland. This basin evolution will control the structural and stratigraphic framework of the basin. The basin fill workflow group 1506 involves the prediction of the types of sediments deposited through geologic time, and their stratigraphic architecture. This workflow may be conducted iteratively with the interpretation of the basin's structural evolution because of the intricate interdependence between these processes. It may be understood that the combination of the global controls workflow group 1502, the basin evolution workflow group 1504, and the basin fill workflow group 1506 may be implemented to provide a sediment fill volume according to the discussion above.

The basin structure workflow group 1508 may encompass the interpretation of the structural framework and evolution, which may be done in the evaluation of play-elements and/or the development of play-element volumes. For example, the basin structure workflow group 1508 may relate to the identification of the types of potential hydrocarbon traps expected in the basin, as well as the generation and migration of hydrocarbons within the basin.

The hydrocarbon systems workflow group 1510 may be adapted to produce an interpretation of the distribution of hydrocarbon source rocks, reservoirs, seals, traps, maturation, and migration in the identification of play elements and the development of play-element volumes. The hydrocarbon systems workflow group 1510 may be further adapted to integrate these interpretations and play-element volumes to define play-concept volumes that can be used to identify the hydrocarbon plays and prospects in the basin. With this understanding, the geoscientist has sufficient information to estimate the geologic risks and potential hydrocarbon reserves in favorable areas.

The assessment workflow group 1512 may allow for the systematic quantification of the resource potential of each play and/or prospect that has been recognized. This assessment workflow group provides a basis to evaluate the potential economic value of the exploration opportunities, which is the objective of the opportunity identification/evaluation workflow group 1514. The results of this analysis serve to make business decisions to pursue and explore for exploration opportunities.

Figure 16:
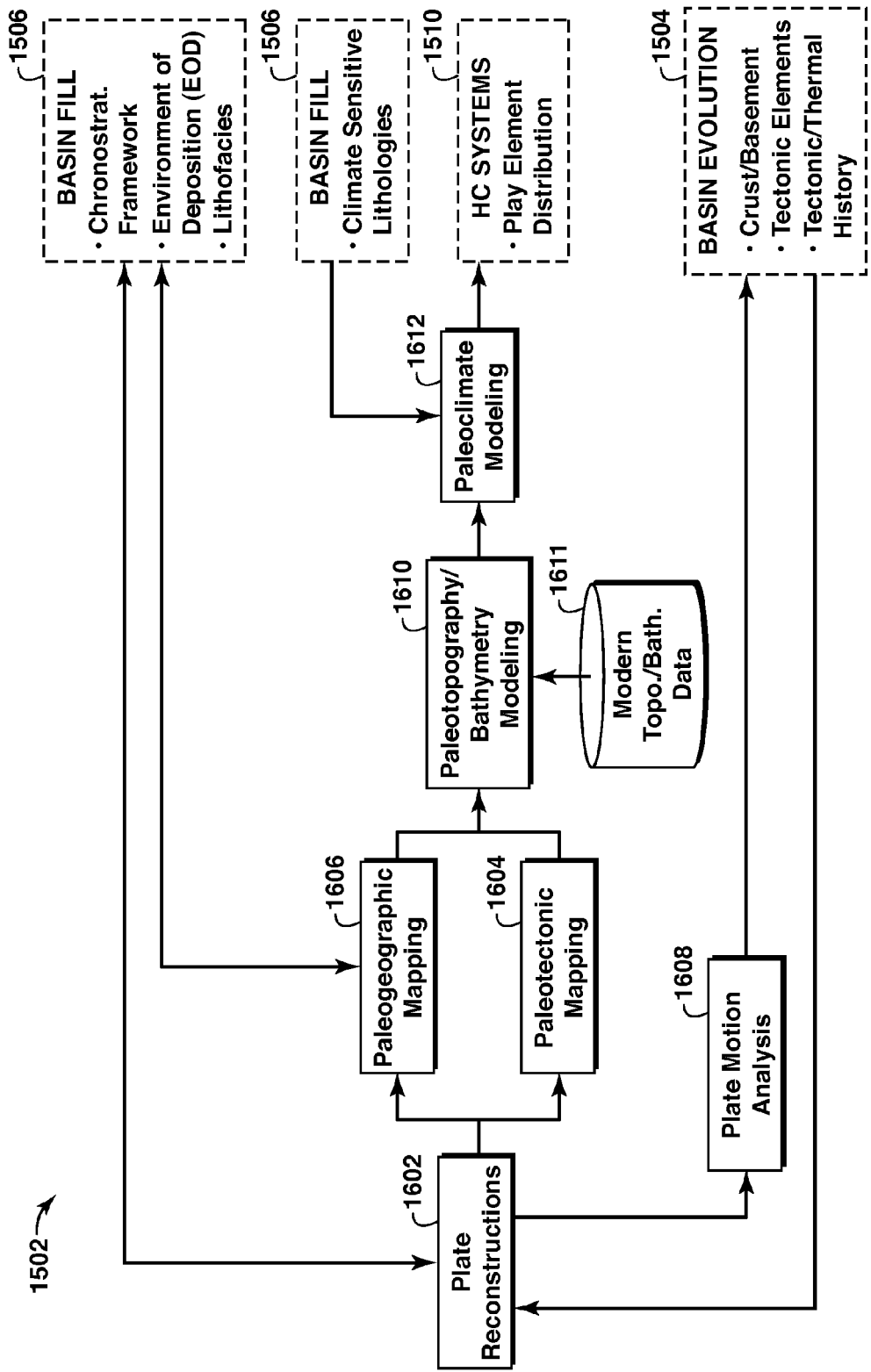
FIG. 16 provides an exemplary flow chart of a global controls workflow.

FIG. 16 provides a representative schematic flow chart of a global controls workflow group 1502. The global controls workflow group investigates the large-scale controls on the tectonic and paleoenvironmental evolution of a region. It typically begins with an analysis of the plate tectonic reconstruction of the region of interest through geologic time, represented by box 1602. Various models, including global models, may be used for plate reconstructions that may be used in this workflow, but in many cases this analysis results in revisions to that global plate model in the region of interest. The position of the earth's lithospheric plates will have a major influence on the paleotectonic and paleogeography interpretation, which is represented by boxes 1604 and 1606, respectively. The global control workflow group 1502 may also consider how the tectonic plates move through time relative to one another, box 1608, which may affect deformation of the lithosphere (extension, contraction, and thickness). Some or all of this information may be used to predict the evolution of uplift and subsidence (part of the basin evolution workflow group 1504) and interpretations of the paleotopography and paleobathymetry, at box 1610. Additionally, modern data 1611 regarding the topography and/or bathymetry may be input into the global controls workflow group, such as into the interpretation of the paleotopography and/or paleobathymetry. The reconstruction of paleogeography and paleotopography are input to paleoclimate simulations, at 1612, that predict key paleoenvirnonmental parameters in the past, such as temperature, rainfall, seasonality, ocean restriction, and upwelling.

As illustrated in FIG. 16, the outputs of the global controls workflow group are key inputs later in the integrated workflow, such as to the basin fill workflow group 1506, the basin evolution workflow group 1504, and the hydrocarbon systems workflow group 1510. As is further illustrated in FIG. 16, one or more of the global controls processes may be revisited and adjusted during the implementation of the integrated workflow 1500. For example, information or findings from the basin evolution workflow group 1504 and/or the basin fill workflow group 1506 may be fed back to the global controls workflow group for various purposes.

Figure 17:
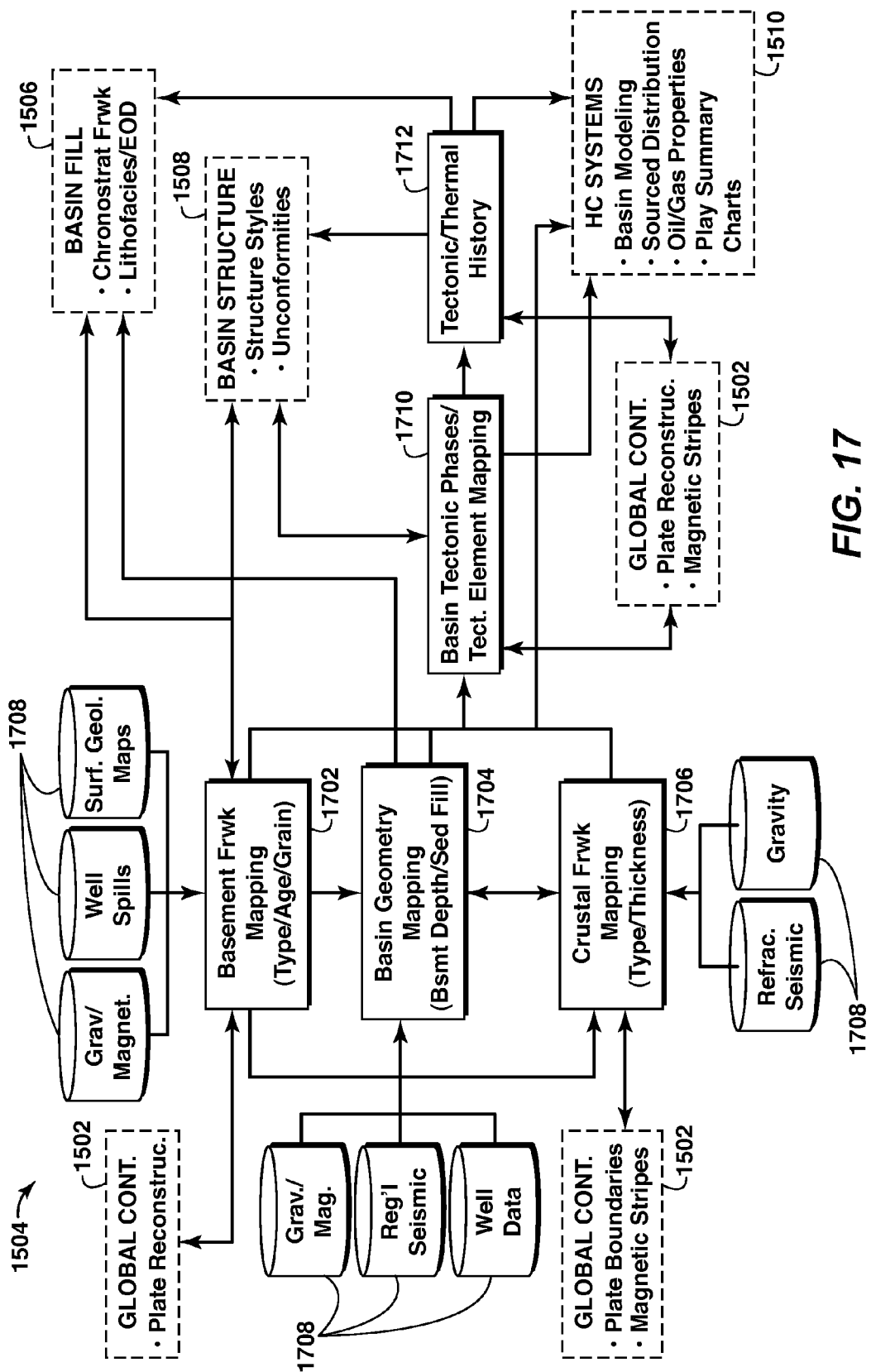
FIG. 17 provides an exemplary flow chart of a basin evolution workflow.

FIG. 17 provides a similar schematic flow chart of steps in a representative basin evolution workflow group 1504. The basin evolution workflow group 1504 evaluates the evolution of the basin shape through geologic time. This interpretation is highly influenced by the findings from the global controls workflow group 1502 and provides important constraints for the subsequent basin fill, basin structure, and hydrocarbon systems workflow groups 1506, 1508, 1510, respectively. Regional maps of the basement framework, including the type, age, and grain of the basement rocks, may be completed early in this workflow, such as at 1702. The basin geometry is mapped and represented as a depth structure map, which also may allow the construction of a total sediment fill isopach map, such as at 1704. The basin evolution workflow group further includes, such as at 1706, interpreting the crustal type and thickness and checking the same for consistency with the basement framework 1702 and the sediment fill 1704. Available data (gravity/magnetics, seismic, wellbores, and surface geology) 1708 may be integrated into these interpretations to constrain the maps. Additionally, the plate tectonic reconstruction and other information from the global controls workflow group 1502 may be taken into consideration. This portion of the workflow provides a present-day framework for the basin, and is an important step before interpreting how the basin initially formed, and how it evolved to its present-day configuration.

Basin evolution is characterized by tectonic phases, which are defined by the type of subsidence and gross basin geometry over a specified geologic age interval, and which may be mapped as at box 1710. This interpretation may require an analysis of subsidence and uplift through time, which is also constrained by the history of sediment fill and structural evolution of the basin, and therefore is commonly refined after these subsequent sediment fill workflow group 1506 and basin structure workflow group 1508 are completed, as illustrated by the various feedback and feed-forward data paths in FIG. 17. Once the sequence of tectonic phases is defined, the geoscientists will interpret the tectonic and thermal processes that control the basin evolution, which is represented by box 1712 in FIG. 17. This interpretation provides a genetic context within which the character of the basin fill, basin structure, and hydrocarbon systems elements can be predicted.

Figure 18:
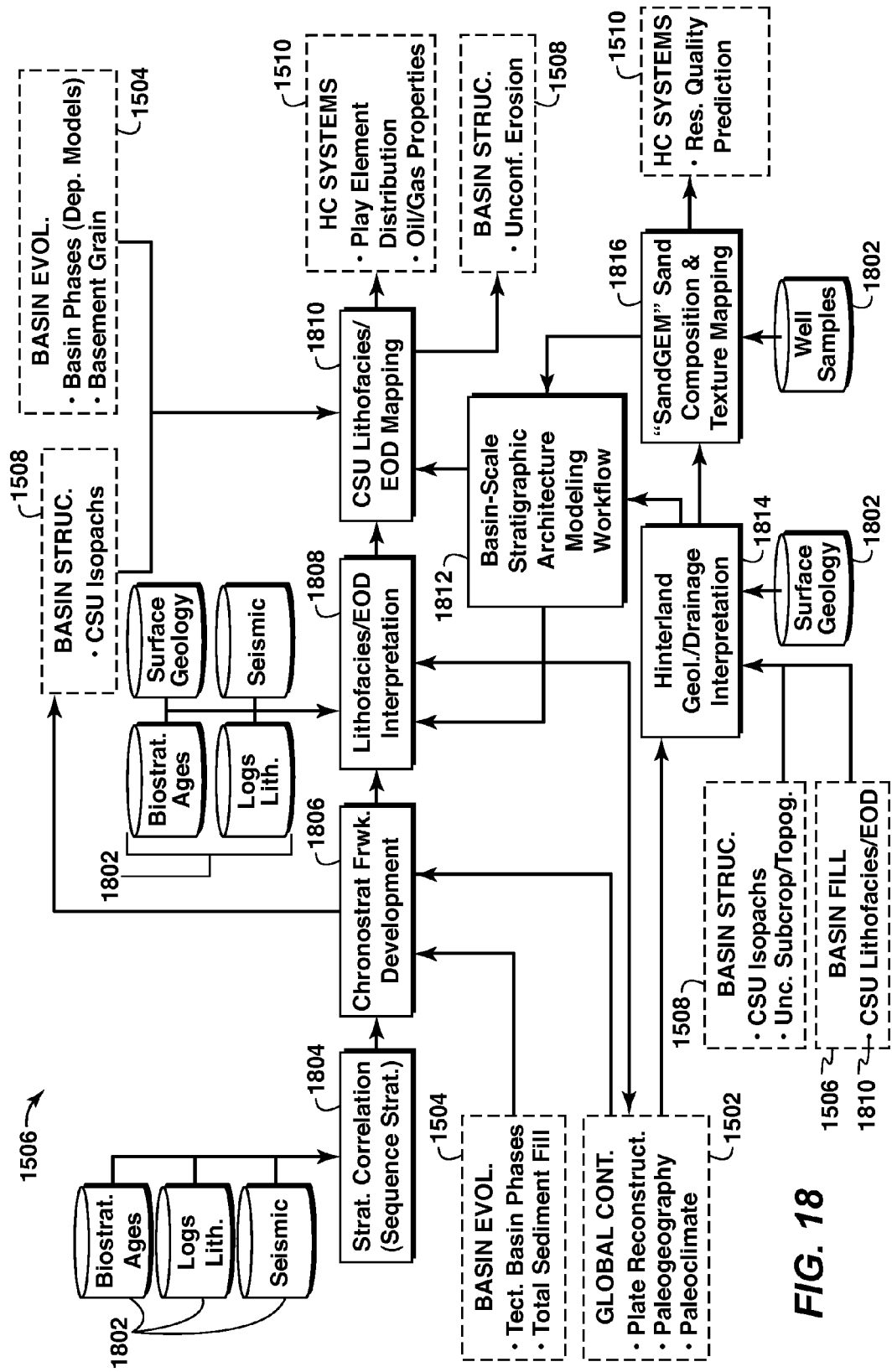
FIG. 18 provides an exemplary flow chart of a basin fill workflow.

FIG. 18 provides a schematic flow chart of a representative basin fill workflow group 1506, which is implemented to characterize the chronostratigraphic framework and lithofacies of the basin sedimentary fill. Subsurface data 1802, including seismic sections, well logs and samples, and biostratigraphy, are integrated and interpreted during this workflow. Seismic stratigraphy and well-log correlations are interpreted with the application of the principles of sequence stratigraphy, such as shown by box 1804. Sequence stratigraphy is conventional and may be implemented in accordance with the teachings of P. R. Vail et al, *Seismic Stratigraphy and Global Changes in Sea Level*, in AAPG Memoir 26, Seismic Stratigraphy—Applications to Hydrocarbon Exploration, pp. 49-212 (1977), which is incorporated herein by reference for all purposes, or related teachings. These correlations are related to the global eustatic sea level curve to establish a chronostratigraphic framework 1806, within the context of the basin tectonic evolution established earlier in the workflow, such as by the global controls workflow group 1502 and the basin evolution workflow group 1504. Within this chronostratigraphic framework the geoscientists conduct an interpretation of the lithofacies and depositional environments of the sediments, represented by box 1808, and these interpretations are represented by lithofacies and environment-of-deposition maps for each chronostratigraphic interval, which is represented by box 1810. The distribution and thickness of these mapping units is constrained by the basin structure from the basin structure workflow group 1508 and by the basin evolution from the basin evolution workflow 1504.

The workflow above largely involves the interpretation of available data 1802, which may be surface data and/or subsurface data. In many settings, the available data are inadequate to confidently interpret the stratigraphy and lithofacies of the entire sediment fill of the basin. In these cases, modeling techniques can be applied to predict the stratigraphic architecture and lithologies. This optional approach is referred to as the basin-scale stratigraphic architecture workflow, represented by box 1812 in FIG. 18. Forward modeling of basin-scale sediment fill is an established technology, which may be implemented in any suitable manner. An exemplary implementation of basin-scale forward modeling is described in U.S. Pat. No. 7,043,367, issued to Institut Francais du Petrol, which is incorporated herein by reference for all purposes. Inputs to the basin scale stratigraphic architecture workflow may include: 1) tectonic subsidence and flexure, 2) eustacy, and 3) sediment supply to the basin. The tectonic subsidence and flexure may be derived from the basin evolution workflow 1504. Sediment supply volume and composition can be estimated from the hinterland geology/drainage interpretation workflow, represented by box 1814, which may be as described in publications by W. A. Heins &

S. Kairo, *Predicting Sand Character with Integrated Genetic Analysis*, Geological Society of America Special Paper 420: 345-379 (2007) and Kairo et. al. International Patent Publication WO 2006/016942 A1, each of which is incorporated herein by reference for all purposes, provides an exemplary implementation of a hinterland geology/drainage interpretation workflow 1814. The input paleoenvironmental controls on sediment character and transport may be determined from paleogeographic reconstructions and paleoclimate models from the global controls workflow 1502. Once these controls are defined, a forward model may be run to predict the stratigraphic architecture and lithofacies of the basin sediment fill. This forward model is integrated with the data-based interpretation to update the chronostratigraphic framework and lithofacies/EOD maps. Finally, in addition to direct observations from sediment samples 1802, ExxonMobil's Sand Generation and Evolution Model (SandGEM), as described in PCT Patent Publication WO 2006/016942 A1, may be applied to predict the composition and texture of sands deposited in the basin, such as at box 1816.

As with the other workflow groups described above, the results of the basin fill workflow group 1506 and any one or more of its steps and/or internal workflows may provide important constraints on the hydrocarbon systems workflow group 1510 and the basin structure workflow group 1508. Similarly, one or more of the other workflow groups of the integrated workflow 1500 may be used as inputs and/or constraints in the basin fill workflow group 1506.

Figure 19:
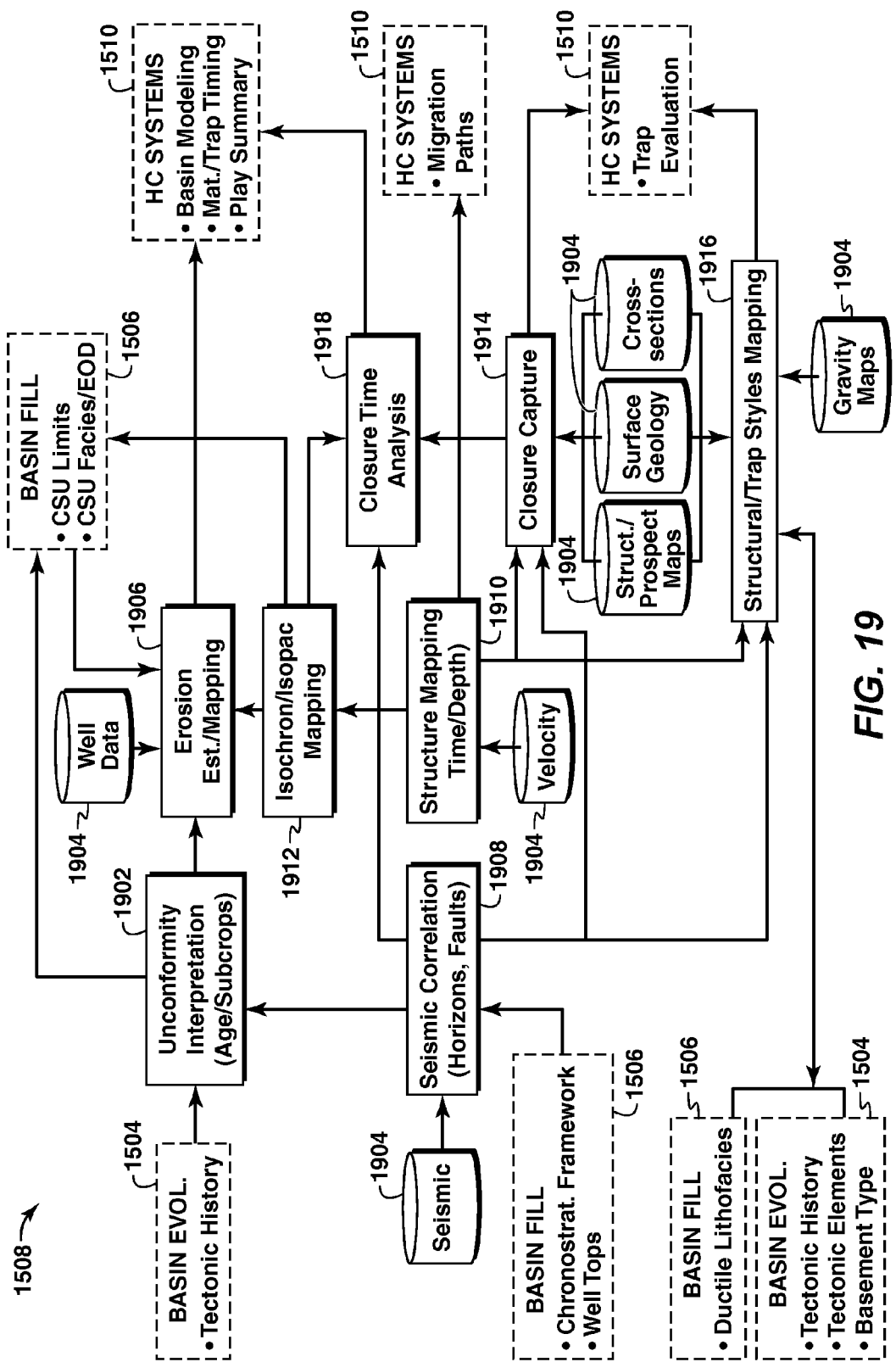
FIG. 19 provides an exemplary flow chart of a basin structure workflow.

FIG. 19 provides a schematic flow chart of a representative basin structure workflow group 1508, which may be adapted to develop a structural framework at the basin-to-play scale and to characterize the distribution and size of structural closures. Important inputs and/or constraints to this workflow group may be supplied from the basin evolution and basin fill workflows, 1504 and 1506, as illustrated at various points in FIG. 19. Commonly the geoscientists will iterate their analyses back-and-forth across these workflows because of the intimate interplay between structural and sedimentary evolution of a basin. In some implementations, computer systems may be implemented to facilitate the iterative analyses. The structural analysis includes the interpretation and dating of unconformities that correspond to key tectonic events in the basin history, such as represented by box 1902. Field data 1904, such as surface data and subsurface data, which are illustrated as including seismic data and well log data, may be interpreted to generate maps of the amount of erosion associated with each unconformity, such as illustrated at box 1906. Seismic interpretation of stratigraphic horizons and faults may be integrated with the chronostratigraphic framework, box 1908, to produce structure maps (in seismic two-way time and depth) for key horizons, such as at box 1910. The unconformity intepretations 1902 and structure maps are then integrated to generate unit thickness maps (isochrons and isopachs) for the preserved stratigraphic intervals, and restored maps of the pre-erosion unit thicknesses, such as at box 1912. The regional structure and isopach maps provide a framework for the evaluation of the potential hydrocarbon closures in each play.

Depending on the available data and the level of detail in the structure maps, the next step may involve direct characterization of the potential closures, box 1914. In such implementations, the number, type, geometry, area, and height of each closure may be measured from the maps and captured into a database for analysis in later workflows. These characterizations are captured for multiple locations of interest, such as for the locations or cells distributed through a sediment-fill volume, by analyzing each corresponding structure map. In situations where the structure maps do not represent adequate detail, it is possible to predict the closure characteristics (e.g., the trap styles) by analyzing the observed style of structuring across the basin, such as represented by box 1916. The steps represented by boxes 1914 and 1916 may each incorporate various types of field data and/or calculated data from other workflows, such as illustrated representatively by data 1904. The structural styles can be related to closure type and density within each mapped structural province. The structure maps, closures, and structural styles are inputs to the hydrocarbon systems workflow group 1510.

This basin structure workflow 1508 may also include an analysis of closure timing, i.e., the geologic age of the formation of the structural closure, such as shown at box 1918. This analysis is performed by evaluating the stratigraphic relationships (such as the age of depositional thinning or erosion on structures), and may be directly related to the evolution of structural styles in the basin. The closure timing also may be an input to the hydrocarbon systems workflow group 1510.

Figure 20:
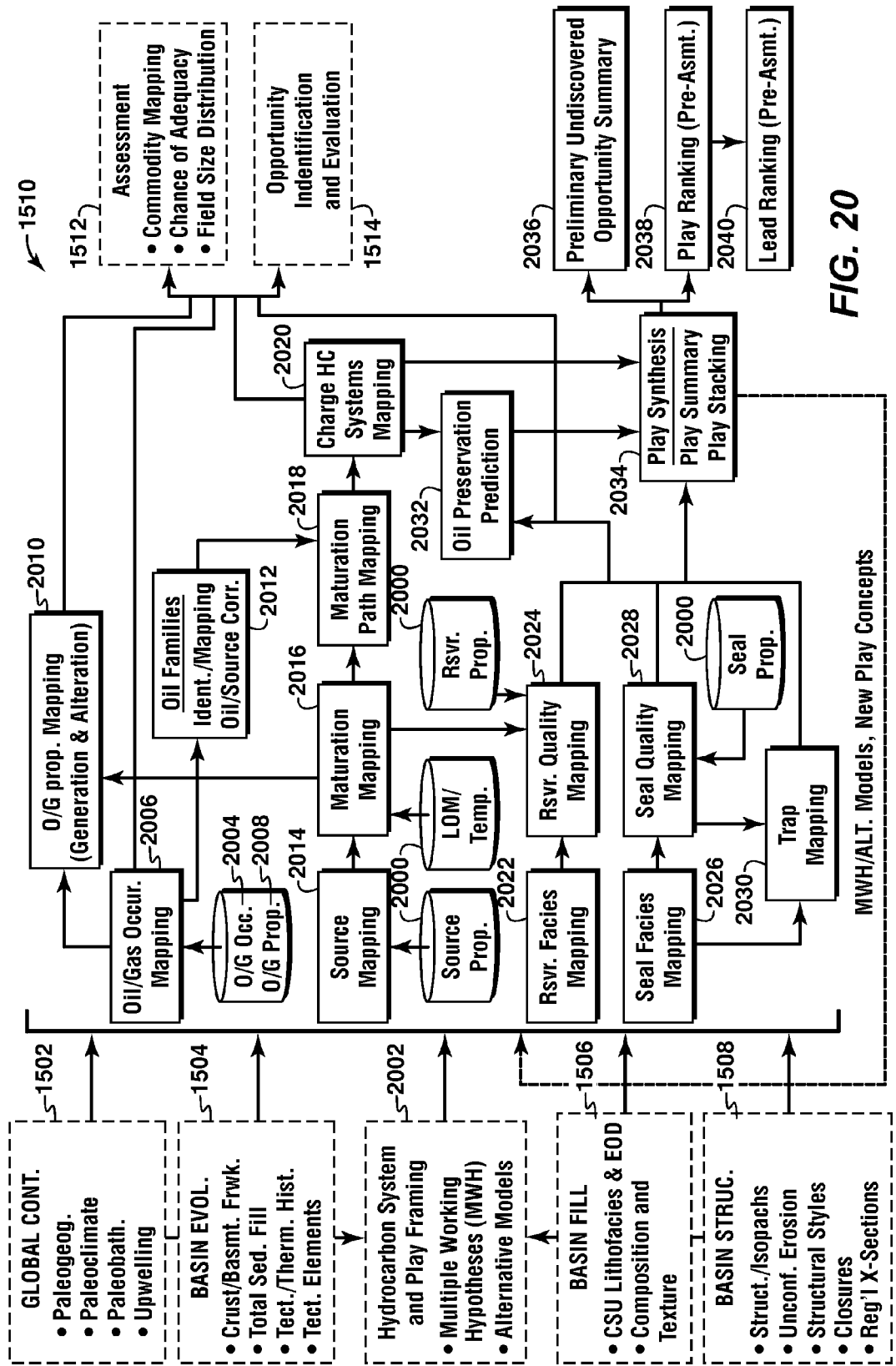
FIG. 20 provides an exemplary flow chart of a hydrocarbon systems workflow.

FIG. 20 provides a schematic flow chart of a representative hydrocarbon systems workflow group 1510. The hydrocarbon systems workflow group 1510 includes several features and steps described in detail above, including the provision of play-element volumes and play-concept volumes. For example, the hydrocarbon systems workflow group 1510 includes the mapping and characterization of all play elements (source, reservoir, seal, trap, maturity, migration, timing, etc.), and their synthesis into a hydrocarbon systems analysis to define play-concept volumes. Inputs to this hydrocarbons systems workflow group 1510 come from all previously-described workflows, and outputs are used in the assessment workflow 1512 and the opportunity identification/evaluation workflow 1514. Additionally, inputs may come from field data, physical measurements, or other modeling systems, which are represented generally in FIG. 20 as inputs 2000.

The hydrocarbon system workflow 1510 typically begins with hydrocarbon system and play framing, at 2002, which integrates the existing understanding of the hydrocarbon system to provide preliminary definitions of the plays to be evaluated. This step is valuable to focus and prioritize the following analysis on the most important areas, intervals, and play elements in the basin. During this analysis, the geoscientists may develop multiple working hypotheses for the hydrocarbon systems that can be tested with the play element interpretations that follow. As described above, the present methods and systems differ from conventional play recognition techniques in that the workflow maintains a basin-scale perspective through the hydrocarbon system workflows 1510, conducting the analysis in the context of basin-scale volumes. While the inputs to the hydrocarbon systems workflow group 1510 facilitate the early identification of the most likely plays, maintaining a basin-scale perspective allows subtle or otherwise more difficult-to-identify plays to be recognized as the geoscientists' understanding of the basin evolves. Throughout the discussion of the hydrocarbon system workflow 1510, several play elements and methods of determining quality and/or likelihood of the play elements will be discussed. As discussed above, these methods may be applied on a basin-level scale to produce one or more play-element volumes.

For example, the known occurrences of hydrocarbons 2004 (oil and gas fields, shows, surface seeps, etc.) may be compiled and mapped, at box 2006, to serve as an audit of the hydrocarbon systems framing at 2002. The hydrocarbon properties 2008 (type, composition, and other geochemical analyses) of these known occurrences are also mapped, at box

2010, to provide constraints on the source rock distribution, maturity, and migration analyses. Geochemical analysis of the sampled source rocks and their extracts (including total organic carbon content, RockEval pyrolysis, and biomarkers), may be related to the hydrocarbon property and thermal maturity maps to define oil families, at box 2012, which associate hydrocarbons with their inferred sources in the subsurface. Overall this portion of the workflow provides valuable calibration for the integrated hydrocarbons systems framework that is being constructed.

Source rock presence is another aspect of the hydrocarbon systems analysis. Source rock mapping, at box 2014, may include the interpretation of constraining data from well samples (source thickness, richness, and organic matter type) and wireline logs (thickness and organic richness). In some implementations, geoscientists reconstruct the conditions that primarily control the deposition of organic-rich rocks, including production, destruction, and dilution of organic matter in the sediments. As discussed above, a systematic source modeling workflow, referred to as "Source Retrodiction and Environmental Reconstruction" (SourceRER) may be used. Aspects and functionality of SourceRER are described in more complete detail in the PCT application previously incorporated herein by reference. These reconstructions, and the resulting predictions of organic-rich rocks, are helpful in areas of limited direct evidence for effective source rocks. The predicted character of organic rich rocks will determine their potential for generating hydrocarbons during maturation.

Maturation analysis of potential source rocks may be conducted to predict the timing, volume, and character of generated hydrocarbons, at box 2016. Inputs may include the source rock characteristics (distribution, thickness, and quality) and subsurface calibration data that constrain the heat flow history. This analysis may be performed with basin modeling programs that reconstruct the burial and thermal history of the basin to calculate and map the hydrocarbon yield through time for each potential source rock. The maturity and yield maps may be integrated with structure and lithofacies maps to analyze and map migration pathways from mature source rocks to potential traps and seals, such as at box 2018. In some cases, 3D volumetric migration modeling may be applied to simulate the flow of hydrocarbons in a basin. The maturation and migration analyses 2016, 2018 are integrated to develop hydrocarbon charge maps, at box 2020. Maturation and migration play-element volumes were described further above together with exemplary play-element volume illustrations.

The reservoir play element, as with other play elements may be evaluated in two steps: presence and quality. Reservoir presence is commonly evaluated from the lithofacies and depositional environment maps/volumes (see FIG. 18), which depict the distribution of favorable sandstone and/or carbonate reservoir facies, such as illustrated at box 2022 in FIG. 20. Reservoir quality analysis, box 2024, commonly includes both characterization of the deposited sediments and forward modeling of the reservoir quality during sediment burial. Inputs to the forward modeling include the deposited sediment character and burial thermal history from the maturation mapping/volumes of box 2016, among other inputs. The forward modeling of reservoir quality may consider the effects of compaction, cementation, dissolution, and other diagenetic processes. U.S. Patent Publication No. 2007/0203677 provides examples of methods for simulating and estimating sandstone properties and is incorporated herein by reference in its entirety and for all purposes.

The seal play element evaluation also considers both presence and quality. Seal facies maps/volumes, box 2026, are commonly derived from the lithofacies and isopach maps/volumes constructed in the basin fill workflow of FIG. 18, and convey the geographic distribution of fine-grained rocks that represent potential seals. Seal quality maps/volumes, box 2028, are constructed on the basis of rock property data commonly derived from subsurface information, including well logs and samples 2000. Depending on the types and amount of data available, seal quality may be characterized qualitatively or quantitatively in terms of seal capacity (for example, capillary entry pressure).

Trap mapping, box 2030, is commonly derived from the basin structure workflow of FIG. 19, but also considers the stratigraphic and geographic distribution of reservoir and seal play elements to define potential hydrocarbon traps. This includes the identification and mapping of stratigraphic and structural/stratigraphic combination traps.

Oil preservation potential and risk is evaluated on the basis of original hydrocarbon character and the alteration processes that occur during migration, burial, and entrapment, such as indicated by the various inputs into box 2032 of FIG. 20. The relative timing of these processes controls the thermal evolution of trapped hydrocarbons, which allows for the prediction of hydrocarbon alteration (for example, oil biodegradation or cracking processes).

At this point in the Hydrocarbon Systems Workflows, the geoscientists are prepared to synthesize the play-element volumes to produce play-concept volumes that represent the favorability for hydrocarbon accumulations in each defined play, at box 2034. As described above, the various play-element volumes developed above can be analyzed together or separately to produce play-concept volumes as well as more conventional representations of the play-concepts within a basin. This synthesis allows for preliminary identification of opportunity areas, box 2036; qualitative ranking of plays, box 2038; and ranking of identified leads and prospects, box 2040. Additionally, the analysis of the play-element volumes provides play-concept volumes that are available for further study and/or updating as additional information about the basin is obtained. The play-element volumes and maps also may be inputs to the assessment workflows 1512 and the opportunity identification and evaluation workflows 1514.

Figure 21:
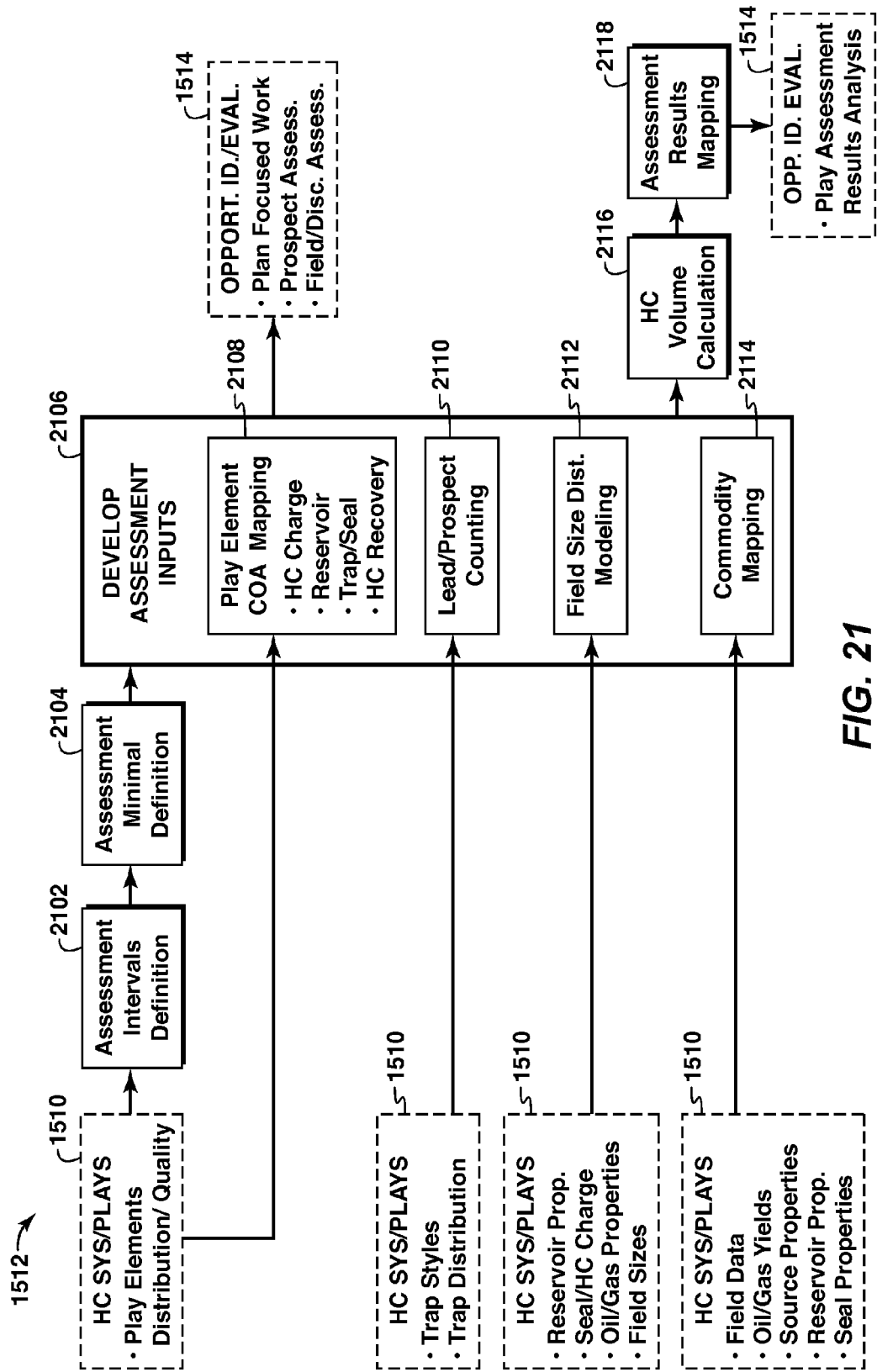
FIG. 21 provides an exemplary flow chart of an assessment workflow.

FIG. 21 provides an exemplary flow chart of a representative assessment workflow 1512. Assessment is a process in which undiscovered hydrocarbon potential is estimated for geologically defined exploration plays and prospects. The application of Geographic Information Systems (GIS) throughout the Integrated Hydrocarbons Systems Workflow allows for a systematic spatial analysis for conducting the assessment process. In some implementations, the assessment workflow may be a distinct step. Additionally or alternatively, the assessment workflow may be implemented at any stage in the development and/or production of a basin to aid geoscientists in identifying hydrocarbon plays.

The assessment workflow 1512 as illustrated includes the definition of the play intervals that will be assessed separately, box 2102. A play is a mappable area containing a family of fields and prospects with similar geologic controls. These similar geologic controls are commonly defined on the basis of the mapped play elements, including source, reservoir, and seal. As described above, the play-concept volume can be assessed to define play-concept geobodies having such similarities. The methods and assessments identified in the assessment workflow 1512 are examples of the manners in which the play-concept volume(s) may be used to aid in the identification of hydrocarbon plays. Other uses of the play-concept volumes are within the present disclosure. The illustrated assessment workflow also includes the definition of a common minimum field size that will be included, box 2104. This may be used to produce statistically-valid estimates of hydrocarbon potential, and considers the smallest prospect size that can be reliably identified over the area of best control.

Inputs to the play assessment workflow may be developed, at box 2106, and may include (1) the chance that a potential play exists, (2) the number of future fields in the play, (3) the hydrocarbon resource size distribution of future fields, and (4) the hydrocarbon type (oil, gas, and condensate), which may be developed from the preceding steps in the workflow. The probability that the play exists is estimated from play element chance of adequacy (COA) maps, box 2108. Chance of adequacy maps may be generated for the various play-elements, including hydrocarbon charge (considering source, maturity, migration, and timing), reservoir, trap and seal. As described above, the play-element volumes of the present systems and methods may be configured to capture, or be adapted to be attributed with properties related to the presence of a play element as well as its probability of satisfying criteria (e.g., a chance of adequacy). By providing a play-element volume depicting or otherwise representing both the presence of the element and the likelihood that the element satisfies criteria, the present systems and methods may be facilitated. Chance of adequacy or the probability of satisfying determined criteria may be estimated based on the perceived risk that the play element is present and the uncertainty in the estimated risk. As described above, a measure of the composite likelihood that a particular location represents a hydrocarbon play may be generated mathematically combining the chance of adequacy for one or more of the play elements.

The number of future fields can be determined by counting the number of known leads and prospects in each play, box 2110. In areas with higher uncertainty, it may be desirable to postulate the density of leads based on knowledge from better-constrained areas. For example, play analogies may be developed and used as described above to aid in play identification for basins or regions with a basins with fewer constraining data points. Additionally, in some implementations, the number of leads/prospects so identified may be multiplied by an estimated future success ratio to determine the number of future fields in the play.

The future field size distribution, box 2112, for each play can be derived from the volumetric assessment of individual prospects in the play and from the known field sizes in explored areas of the play. Alternatively, instead of assessing the size of each prospect, the probabilistic distributions of trap size, reservoir thickness, and hydrocarbon fill can be analyzed using Monte Carlo techniques to predict the future field size distribution in the play. The future field sizes are commonly represented as a probability distribution that prescribes the chance of exceeding a given field size. In some implementation, only future field sizes that exceed the field size minimum (described above) are included in the distribution. In other implementations, all fields will be included and presented in the play-concept volume for visualization. Those above a field size minimum may be presented differently for easy identification.

The hydrocarbon type anticipated in each play, region of the play-concept volume, and/or play-concept geobody may be represented by commodity maps or volumes, such as illustrated in box 2114. These maps or volumes may be derived from the analysis performed in the hydrocarbon systems workflow 1510 of FIG. 20, including (1) oil and gas occurrence mapping, source type mapping, maturation mapping, and migration mapping. The commodity maps will identify the type(s) of hydrocarbons (oil, gas, and/or condensate) expected in each play and prospect being assessed.

As illustrated in FIG. 21, the assessed resource volumes may be calculated in box 2116 from the chance of adequacy maps, number of future fields, field size distribution, and commodity type maps. As described throughout this disclosure, the present systems and methods analyze and capture data on a basin-scale level, storing, calculating, and presenting data on a volumetric basis representative of the geologic basin under consideration. Accordingly, the present systems and methods allow for the undiscovered resource potential of the basin to be represented by assessment results maps or volumes, as in box 2118, which may include features for highlighting assessment results for each play or play-concept geobody assessed. The assessment maps or volumes may be used to identify the most favorable areas for hydrocarbon exploration.

FIG. 21 further illustrates that the results and data from the assessment workflow 1512 may be passed to an opportunity identification and evaluation workflow 1514. The methods and systems utilized in this workflow may comprise of a variety of steps generally focused on the business and economic analysis of a proposed exploration opportunity. The results of the assessment workflow 1512 provides geoscientists with more information about the entire basin than is available with conventional systems and methods that are applied to limited portions of the basin, thanks in part to the volumetric, basin-scale approach, which is available due to the methods and techniques described herein. Accordingly, while the processes performed in the opportunity identification and evaluation workflow may resemble the conventional methods to evaluate possible hydrocarbon plays, the system and methods used to identify the possible plays are different, as described herein. Any suitable method for performing economic analysis of identified plays may be utilized in this opportunity evaluation workflow 1514.

Conclusion

As described above, the present systems and methods offer numerous advantages over exploration play analysis methods. The calibration of sediment fill models and their integration with play-element prediction models enables internally-consistent and quantitative inference of all play elements throughout the volume of the basin, including areas that can not readily be mapped with existing data. Additionally or alternatively, the volumetric approach may provide richer analysis and visualization capabilities than the conventional 2D "map-stacking" workflows generally in use. The volumetric approach helps preclude overly-focused work-efforts at an early stage; work-efforts too often driven by a limited view of only a small portion of the basin fill. Additionally, the integration of modeling concepts and tools produces a play-element volume to help recognize meaningful relationships that could otherwise be missed. Additionally, the systems and methods herein facilitate rapid generation and comparison of alternative scenarios, such as alternative geological evolution scenarios. Additionally or alternatively, some implementations incorporate computerized or otherwise automated recognition methodologies to recognize play concepts from relationships among play-element volumes, which result in delineation and characterization of play concepts in a play-concept volume. Still additionally, some implementations may be adapted or implemented to objectively recognize and identify play-concept and play-element analogs and to quantify the degree of similarity. Additionally or alternatively, the present systems and methods provide the ability to incorporate, analyze, and otherwise account for uncertainty associated with play-element volumes and play-concept volumes.

While the present techniques may be susceptible to various modifications and alternative forms, the exemplary embodiments discussed above have been shown by way of example. However, it should again be understood that the invention is not intended to be limited to the particular embodiments disclosed herein. Indeed, the invention is to cover all modifications, equivalents, and alternatives falling within the spirit and scope of the invention as defined by the following appended claims.

What is claimed is:

1. A method of identifying hydrocarbon plays in sedimentary basins, the method comprising:
   a) providing a sediment fill volume representing at least one of lithology distribution, sediment age distribution, depositional conditions distribution, burial history, erosion history, and compaction history in a geologic basin;
   b) applying one or more predictive models to the sediment fill volume in a computerized system to provide at least one play-element volume; wherein each of the at least one play-element volume provides at least a three dimensional representation of at least one play element; and wherein, for each of a plurality of locations within the geologic basin, each of the at least one play-element volume represents at least qualities of the at least one play element and a probability that the at least one play element satisfies determined criteria; wherein the sediment fill volume comprises a plurality of cells in at least three dimensions representing at least one characteristic of sedimentary fill in the geologic basin; wherein the sedimentary fill volume comprises a plurality of cells representing temperature and pressure properties applied to locations of the sediment fill volume; wherein the at least one play-element volume comprises a plurality of cells corresponding to the plurality of cells in the sediment fill volume and the associated temperature and pressure properties; and wherein the at least one play-concept volume comprises a plurality of cells corresponding to the plurality of cells in the at least one play-element volume;
   c) analyzing at least one of the at least one play-element volume to define at least one play-concept volume; wherein each of the at least one play-concept volume provides an at least three-dimensional representation of a hydrocarbon play in a subsurface formation; wherein each of a plurality of locations within the at least one play-concept volume is attributed with: 1) an identification of each play element associated with the location, 2) the qualities of each play element associated with the location, 3) the probability for each play element that the play element satisfies determined criteria, and 4) a composite likelihood that the location represents a hydrocarbon play;
   d) exporting at least one of the at least one play-element volume and the at least one play-concept volume; and
   e) utilizing at least one of the at least one play-element volume and the at least one play-concept volume to identify one or more hydrocarbon plays.

2. The method of claim 1 wherein the at least one play-element volume represents one or more play elements selected from source rock, reservoir presence, reservoir quality, hydrocarbon seal, organic maturation, hydrocarbon migration, hydrocarbon yield, and trap regime.

3. The method of claim 1 wherein the one or more predictive models applied to the sediment fill volume to provide at least one play-element volume are selected from one or more of full-physics computational models; parametric models applying empirical principles; parametric models applying physics-based principles; Bayesian-logic based models; and one or more mathematical combinations of the same.

4. The method of claim 1 wherein the at least one play-element volume's representation of the probability that the at least one play element satisfies determined criteria is determined based at least in part on one or more characteristics of the sediment fill volume selected from environment of deposition, paleo-climatic conditions, lithology properties, burial history, and structural position within the sediment fill volume.

5. The method of claim 1 wherein the composite likelihood that the location in the play-concept volume represents a hydrocarbon play is determined at least in part by one or more of temporal and spatial relationships between one or more of the play elements associated with the location and the play elements associated with neighboring locations.

6. The method of claim 1 wherein the exporting of at least one of the at least one play-element volume and the at least one play-concept volume comprises presenting at least one of the volumes for visualization in at least one of geographic space and Wheeler space.

7. The method of claim 1 wherein one or more play-concept geobodies are defined around one or more locations of the at least one play-concept volume; wherein each play-concept geobody encompasses one or more locations identified by at least one of cluster analysis and principal-component analysis as having favorable temporal and spatial relationships for forming a hydrocarbon play; and wherein the one or more play-concept geobodies are exported for use in identifying one or more hydrocarbon plays.

8. The method of claim 7 wherein the one or more play-concept geobodies are exported for visualization in three dimensions; and wherein one or more of the play-concept geobodies is attributed with properties for visualization of one or more attribute of the one or more play-concept volume locations comprising the play-concept geobody.

9. The method of claim 1 wherein at least one of the sediment fill volume and the predictive models is based at least in part on one or more estimated data inputs, wherein each estimated data input is associated with an estimation probability, and wherein at least one of the at least one play-element volume's representation of the probability that the at least one play element satisfies determined criteria is based at least in part on the one or more estimated data inputs and associated estimation probability.

10. The method of claim 9 wherein the composite likelihood that the location represents a hydrocarbon play is based at least in part on the one or more estimated data inputs and associated estimation probability.

11. The method of claim 9 wherein at least one of the sediment fill volume, the at least one play-element volume, and the at least one play-concept volume is compared against at least one measured parameter; and wherein one or more of the estimated data inputs is varied to minimize differences between the at least one measured parameter and the at least one of the sediment fill volume, the at least one play-element volume, and the at least one play-concept volume.

12. The method of claim 1 wherein the sediment fill volume is based at least in part on known data and on estimated data; wherein providing a sediment fill volume comprises providing a plurality of sediment fill volumes representing one or more of the distributions and histories in the geologic basin; and wherein the one or more of the distributions and histories of each sediment fill volume are determined based at least in part on differing estimated data inputs regarding evolution of the basin.

13. The method of claim 12 wherein applying one or more predictive models to provide at least one play-element volume is applied to each of the plurality of sediment fill volumes generating a play element collection for each of the plurality of sediment fill volumes; wherein at least one play-concept volume is defined for each play element collection such that each play-concept volume corresponds to differing estimated data inputs regarding evolution of the basin.

14. The method of claim 1 further comprising:
performing hydrocarbon production related operations in the geologic basin;
collecting geologic data regarding the basin;
updating the sediment fill volume based at least in part on the collected geologic data regarding the basin; and
repeating steps (b)-(e) using the updated sediment fill volume.

15. The method of claim 14 further comprising updating at least one of the one or more predictive models based at least in part on the collected geologic data.

16. The method of claim 1 wherein the method is applied to a currently producing geologic basin to identify one more previously unidentified hydrocarbon plays in the geologic basin.

17. A system adapted for use in identifying hydrocarbon plays in sedimentary basins, the system comprising:
a processor adapted to execute instructions;
a storage medium in communication with the processor; and
at least one instruction set accessible by the processor and saved in the storage medium; wherein the at least one instruction set is adapted to:
access a sediment fill volume representing at least one of lithology distribution, sediment age distribution, depositional conditions distribution, burial history, erosion history, and compaction history in a geologic basin;
apply one or more predictive models to the sediment fill volume to provide at least one play-element volume; wherein each of the least one play-element volume provides at least a three dimensional representation of at least one play element; and wherein, for each of a plurality of locations within the geologic basin, each of the at least one play-element volume represents at least qualities of the at least one play element and a probability that the at least one play element satisfies determined criteria; wherein the sediment fill volume comprises a plurality of cells in at least three dimensions representing at least one characteristic of sedimentary fill in the geologic basin; wherein the sedimentary fill volume comprises a plurality of cells representing temperature and pressure properties applied to locations of the sediment fill volume; wherein the at least one play-element volume comprises a plurality of cells corresponding to the plurality of cells in the sediment fill volume and the associated temperature and pressure properties; and wherein the at least one play-concept volume comprises a plurality of cells corresponding to the plurality of cells in the at least one play-element volume;
analyze at least one of the at least one play-element volumes to define at least one play-concept volume; wherein each of the at least one play-concept volume provides an at least three-dimensional representation of a hydrocarbon play in a subsurface formation; wherein each of a plurality of locations within the at least one play-concept volume is attributed with: 1) an identification of each play element associated with the location, 2) the qualities of each play element associated with the location, 3) the probability for each play element that the play element satisfies determined criteria, and 4) a composite likelihood that the location represents a hydrocarbon play; and
export at least one of the at least one play-element volume and the at least one play-concept volume for use by geoscientists in identifying one or more hydrocarbon plays.

18. The system of claim 17 wherein the sediment fill volume is determined by an instruction set accessible by at least one of the processor.

19. The system of claim 17 wherein the sediment fill volume is stored as data adapted to produce a visualization in at least three dimensions.

20. The system of claim 17 wherein the at least one instruction set is further adapted to define at least one play-concept geobody around one or more locations within the at least one play-concept volume; wherein each play-concept geobody encompasses one or more locations identified by at least one of cluster analysis and principal-component analysis as having favorable temporal and spatial relationships for the formation of a hydrocarbon play.

21. The system of claim 17 wherein the at least one instruction set is adapted to export at least one of the at least one play-element volume and the at least one play-concept volume for visualization in at least one of geographic space and Wheeler space.

22. The system of claim 17 wherein the one or more predictive models applied to the sediment fill volume to provide at least one play-element volume are selected from one or more of full-physics computational models; parametric models applying empirical principles; parametric models applying physics-based principles; Bayesian-logic based models; and one or more mathematical combinations of the same.

* * * * *